(12) United States Patent
He et al.

(10) Patent No.: US 10,358,771 B2
(45) Date of Patent: Jul. 23, 2019

(54) METHOD OF DESIGNING MODEL PREDICTIVE CONTROL FOR CROSS DIRECTIONAL FLAT SHEET MANUFACTURING PROCESSES TO GUARANTEE SPATIAL ROBUSTNESS AND TO PREVENT ACTUATOR PICKETING

(71) Applicant: Honeywell Limited, Mississauga (CA)

(72) Inventors: Ning He, Edmonton (CA); Xiaotao Liu, Edmonton (CA); Michael Forbes, North Vancouver (CA); Johan Backstrom, North Vancouver (CA); Tongwen Chen, Edmonton (CA)

(73) Assignee: Honeywell Limited, Mississauga (CA)

( * ) Notice: Subject to any disclaimer, the term of this patent is extended or adjusted under 35 U.S.C. 154(b) by 224 days.

(21) Appl. No.: 15/273,709

(22) Filed: Sep. 23, 2016

(65) Prior Publication Data
US 2018/0087221 A1 Mar. 29, 2018

(51) Int. Cl.
*D21G 9/00* (2006.01)
*G05B 13/04* (2006.01)
*G06F 17/16* (2006.01)

(52) U.S. Cl.
CPC ......... *D21G 9/0054* (2013.01); *G05B 13/048* (2013.01); *G06F 17/16* (2013.01)

(58) Field of Classification Search
CPC .................................................. G05B 13/048
See application file for complete search history.

(56) References Cited

U.S. PATENT DOCUMENTS

| 4,916,615 A | 4/1990 | Chittineni |
| 5,566,134 A | 10/1996 | Dufault |
| 5,758,047 A | 5/1998 | Lu et al. |

(Continued)

OTHER PUBLICATIONS

Fan et al., Two-dimensional frequency analysis for unconstrained model predictive control of cross-directional processes, Automatica 40 (11) (2004) 1891-1903.

(Continued)

*Primary Examiner* — Mohammad Ali
*Assistant Examiner* — Vincent W Chang
(74) *Attorney, Agent, or Firm* — Charles H. Jew

(57) ABSTRACT

Automated parameter tuning techniques for cross-directional model predictive control for paper-making under user-specified parametric uncertainties to reduce variability of the actuator and measurement profiles in the spatial domain is proposed. Decoupling properties of the spatial and temporal frequency components permit separate controller design and parameter tuning. CD-MPC design that explicitly accounts for parametric model uncertainty while finding MPC cost function weighing matrices that prevent actuator picketing and guarantee robust stability of the spatial CD profile. Picketing refers to periodic variation patterns in the actuator array. The inventive technique includes: (i) determining the worst case cutoff frequency of all process models, given parametric uncertainty, (ii) designing a weighing matrix to penalize high frequency actuator variability based on the process model and worst case cutoff frequency, and (iii) finding a multiplier for the spatial frequency weighted actuator variability term in the MPC cost function that assures robust spatial stability.

18 Claims, 11 Drawing Sheets

(56) References Cited

U.S. PATENT DOCUMENTS

| | | | |
|---|---|---|---|
| 6,086,237 | A | 7/2000 | Gorinevsky et al. |
| 6,807,510 | B1 | 10/2004 | Backstrom et al. |
| 7,454,253 | B2 | 11/2008 | Fan |
| 7,459,060 | B2 | 12/2008 | Stewart |
| 7,577,483 | B2 | 8/2009 | Fan et al. |
| 7,650,195 | B2 | 1/2010 | Fan et al. |
| 7,820,012 | B2 | 10/2010 | Stewart |
| 8,224,476 | B2 | 7/2012 | Chu et al. |
| 9,122,261 | B2 | 9/2015 | Lu |
| 2006/0111858 | A1 | 5/2006 | Zhu |
| 2007/0100476 | A1* | 5/2007 | Fan ................. D21G 9/0045 700/31 |
| 2008/0066884 | A1* | 3/2008 | Tran ................. D21G 9/0027 162/198 |
| 2013/0041482 | A1 | 2/2013 | Badwe et al. |
| 2014/0358254 | A1 | 12/2014 | Chu et al. |
| 2015/0268645 | A1 | 9/2015 | Shi et al. |
| 2016/0041536 | A1 | 2/2016 | Benosman et al. |

OTHER PUBLICATIONS

Gorinevsky et al, Performance analysis of cross-directional process control using multivariable and spectral models, IEEE Transactions on Control Systems Technology 8 (7) (2000) 589-600.

Gorinevsky et al, Performance-optimal applied identi-fication of separable distributed-parameter processes, IEEE Transactions on Automatic Control 46 (10) (2001) 1548-1589.

S. R. Duncan, The cross-directional control of web forming process, Ph.D. thesis, University of London, UK (1989).

Laughlin et al, Robust performance of cross-directional control systems for web forming processes, Automatica 29 (6) (1993) 1395-1410.

Duncan et al, The spatial bandwidth of cross directional control systems for web processes, Automatica 33 (2) (1997)139-153.

Stewart et al, Two-dimensional loop shaping, Automatica 39 (5) (2003) 779-792.

Stewart et al, Feedback controller de-sign for a spatially-distributed system: the paper making problem, IEEE Transactions on Control Systems Technology 11 (5) (2003) 612-628.

Fan et al, Approximate steady-state performance prediction of large-scale constrained model predictive control systems, IEEE Transactions on Control Systems Technology 13 (6) (2005) 884-895.

Fan et al,Automated tuning of large-scale multivariable model predictive controllers for spatially-distributed processes, in: American Control Conference, Minneapolis, MN, USA, 2006, pp. 5517-5523.

Van Antwerp et al, Cross-directional control of sheet and film processes, Automatica 43 (2) (2007) 191-211.

Featherstone, et al, Control-oriented modeling of sheet and film processes, AIChE Journal 43 (8) (1997) 1988-2001.

Gorinevsky et al, Identification tool for cross-directional processes, IEEE Transactions on Control Systems Technology 11 (5) (2003) 629-640.

Rojas et al, Spatial frequency antiwindup strategy for cross-directional control problems, IEE Proceedings: Control Theory and Applications 149 (5) (2002) 414-422.

* cited by examiner

METHOD OF DESIGNING MODEL PREDICTIVE CONTROL FOR CROSS DIRECTIONAL FLAT SHEET MANUFACTURING PROCESSES TO GUARANTEE SPATIAL ROBUSTNESS AND TO PREVENT ACTUATOR PICKETING

FIELD OF THE INVENTION

The present invention generally relates to monitoring and controlling continuous sheeting making systems using model-based controllers and more, specifically to techniques that account user-specified parametric uncertainty explicitly in designing the cost function weighting matrices in a CD-MPC to prevent actuator picketing and guarantee robust stability of the spatial profile.

BACKGROUND OF THE INVENTION

The control problems involved in paper-making processes can be divided into machine-directional (MD) control and cross-directional (CD) control. MD control concerns the paper properties along the machine direction, and a lot of control strategies have been reported and implemented.

CD control aims to reduce the variability of the paper property along the cross direction and to tune the dynamical property to meet the end users' specifications. The paper property is measured by a scanner mounted downstream traversing back and forth across the paper sheet; various feedback control strategies are proposed to achieve consistency of the paper profile. CD control is a challenging control problem that may involves hundreds of process actuators and hundreds or thousands of process measurements, and process models typically have a large amount of uncertainty associated with them. There are spatial and temporal aspects to this problem. The spatial aspect relates to variability of the process measurements across the sheet while the temporal aspect relates to variability of each process measurement over time.

Model predictive control (MPC), a control strategy which takes control and state constraints explicitly into consideration, has seen thousands of applications in industry, and has been recently introduced into CD control in paper-making processes with the advance of computational capability as well as the development of fast QP solvers. The spatially-distributed CD process is a two-dimensional (spatial and temporal) frequency process, and the spatial response and temporal response are decoupled. Consequently, the controller tuning of CD processes can be separated into spatial tuning and temporal tuning. Spatial tuning aims to tune the weighting matrices such that the steady-state paper property across the paper sheet is consistent; temporal tuning concerns more about the satisfaction of performance indices in terms of settling times and overshoots.

Many research results on spatial tuning have been reported. The spatial frequency concept of spatially-distributed CD processes has been investigated and the application of the spatial frequency has been proposed for the controller design of CD processes. It has been reported that the spatial frequency response of a single actuator determined the spatial frequency bandwidth of a CD process. A constructive procedure to design spatially-distributed feedback controllers has been applied in paper-making processes. Some stability margin and parameter tuning criteria were obtained via rectangular circulant matrices (RCMs) for the unconstrained CD-MPC, which provided a guide in the parameter tuning algorithms. Furthermore, an approximate steady-state performance prediction technique was proposed to speed up the parameter tuning procedure for the constrained CD-MPC. An automated tuning method was presented for the CD process such that the performance and robustness could be simultaneously satisfied under unstructured uncertainty.

In CD control design, the spatial and temporal aspects of the control problem are normally handled independently. For the spatial aspect of the problem robust control performance is desired. This means that the control will remain stable and will keep the variability of the CD profile small in spite of uncertainty about the process model. However, there is lack of an easy-to-use technique to tune a CD controller to provide a robust spatial control performance in the presence of parametric model uncertainty. Besides, as the CD system has a limited spatial bandwidth, it is also desirable that the limited spatial bandwidth property be explicitly incorporated into the parameter tuning procedure.

SUMMARY OF THE INVENTION

The present invention is based in part on the development of a CD-MPC design that explicitly accounts for parametric model uncertainty while finding MPC cost function weighing matrices that prevent actuator picketing and guarantee robust stability of the spatial CD profile. Picketing refers to periodic variation patterns in the actuator array. The inventive technique includes: (i) determining the worst case cutoff frequency of all process models, given parametric uncertainty, (ii) designing a weighing matrix to penalize high frequency actuator variability based on the process model and worst case cutoff frequency, and (iii) finding a multiplier for the spatial frequency weighted actuator variability term in the MPC cost function that assures robust spatial stability.

In one aspect, the invention is directed to system which forms a material in a spatially-distributed multivariable-array cross-directional process wherein the system includes:

at least one set of actuator arrays each distributed adjacent the material in the cross direction (CD), wherein each set of actuator arrays is controllable to vary the properties of the material:

means for measuring and acquiring properties data about the properties of the material; and a multivariable model predictive controller (MPC) for providing CD control to the cross-directional process, wherein the MPC, in response to signals that are indicative of the properties of the properties data, provides signals to the at least one set of actuator arrays to vary properties of the material, wherein the MPC includes means for automatically spatially tuning the MPC which includes:

(a) means for inputting nominal spatial model parameters and corresponding parametric uncertainty specifications;

(b) means for calculating worst-case cut-off frequency $v_w$ for all process models given the parametric uncertainty;

(c) means for designing a weighting matrix $S_b$ to penalize high frequency actuator variability based on the process model and worst-case cut-off frequency;

(d) means for developing a robust spatial condition based on the parametric uncertainty specifications;

(e) means for adjusting a multiplier of $S_b$ in a MPC cost function to satisfy the robust stability condition; and (f) means for outputting the weighting matrix $S_b$ and its multiplier.

In another aspect, the invention is directed to In a process control system having a multivariable model predictive controller (MPC) for providing control to a spatially-distributed multiple-array, sheetmaking cross-directional (CD) process having at least one manipulated actuator array and at least one controlled measurement array, a method of providing control of the multiple-array process that includes the steps of:

(a) tuning the MPC by the steps of:
(i) inputting nominal spatial model parameters and corresponding parametric uncertainty specifications;
(ii) calculating worst-case cut-off frequency $v_w$ for all process models given the parametric uncertainty;
(iii) designing a weighting matrix $S_b$ to penalize high frequency actuator variability based on the process model and worst-case cut-off frequency;
(iv) developing a robust spatial condition based on the parametric uncertainty specifications;
(v) adjusting a multiplier of $S_b$ in a MPC cost function to satisfy the robust stability condition; and
(vi) outputting the weighting matrix $S_b$ and its multiplier;
(b) inputting the tuning parameters into the MPC; and
(c) controlling the multiple-array CD process with the MPC.

The present invention is particularly suited for so-called "single-beam" controller tuning which is tuning the MPC with respect to a single actuator array comprising of a plurality of manipulated actuators that are arranged in the CD and a corresponding single controlled measurement array. A feature of the present invention is a tuning algorithm which takes the limited bandwidth property into consideration to avoid harmful high-frequency picketing in the control actuator beam. Ubiquitously existing uncertainties make the spatial tuning challenging. The parameters in CD processes are usually identified through bump tests and are inevitably subject to model uncertainties, which may be highly structured. Furthermore, geometric misalignments of CD actuators and measurement profiles, sheet wandering and paper shrinkage, etc, also give rise to some nonlinear uncertainties to system models used in CD-MPC strategies. Thus, it is necessary that spatial tuning algorithms be robust to the uncertainties mentioned above.

Novel aspects of the present invention include:

(1) A weighting matrix $S_b$ has been appropriately designed via the real valued Fourier matrix approach based on the system model and pre-specified parametric uncertainties. The newly designed S penalizes more on the undesirable high-frequency components so that reduced variability of the actuator and measurement profiles is achieved.

(2) A systematic automated design procedure has been developed for the spatial tuning of CD-MPC processes. Given a system model and user specified parametric uncertainties, the matrix $S_b$ and the associated weighting parameters are automatically designed such that robust stability is ensured and better performance is achieved.

DETAILED DESCRIPTION OF PREFERRED EMBODIMENTS

Figure 1:
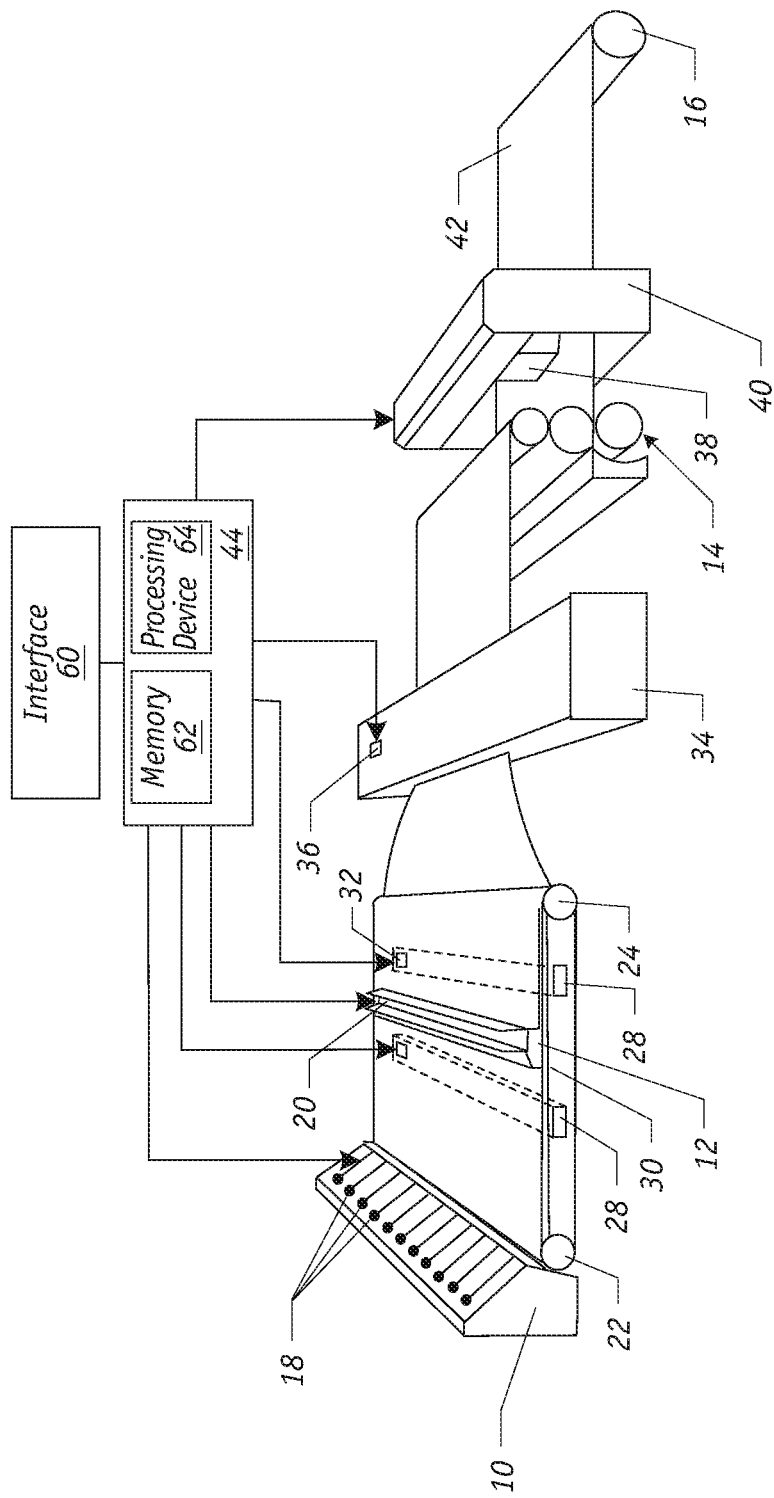
FIGS. 1, 2, and 3 are schematic illustrations of a papermaking system.

As shown in FIG. 1, a system for producing continuous sheet material includes various processing stages such as headbox 10, steambox 12, a calendaring stack 14 and reel 16. The array of actuators 18 in headbox 10 controls the discharge of wet stock (or feedstock) material through a plurality of slices onto supporting web or wire 30 which rotates between rollers 22 and 24. Similarly, actuators 20 on steambox 12 can control the amount of steam that is injected at points across the moving sheet. Sheet material exiting the wire 30 passes through a dryer 34 which includes actuators 36 that can vary the cross directional temperature of the dryer. A scanning sensor 38, which is supported on supporting frame 40, continuously traverses and measures properties of the finished sheet in the cross direction. The finished sheet product 42 is then collected on reel 16. As used herein, the "wet end" portion of the system includes the headbox, the web, and those sections just before the dryer, and the "dry end" comprises the sections that are downstream from the dryer. Typically, the two edges of the wire in the cross direction are designated "front" and "back" (alternatively, referred as the "high" and 'low'") with the back side being adjacent to other machinery and less accessible than the front side.

The system further includes a profile analyzer 44 that is connected, for example, to scanning sensor 38 and actuators 18, 20, 32 and 36 on the headbox 10, steam box 12, vacuum boxes 28, and dryer 34, respectively. The profile analyzer is a computer which includes a control system that operates in response to the cross-directional measurements from scanner sensor 38. In operation, scanning sensor 38 provides the analyzer 44 with signals that are indicative of the magnitude of a measured sheet property, e.g., caliper, dry basis weight, gloss or moisture, at various cross-directional measurement points. The analyzer 44 also includes software for controlling the operation of various components of the sheetmaking system, including, for example, the above described actuators. To implement to the control system of the present invention, analyzer 44 can include memory 62 and processing devices 64 to execute software/firmware instructions for performing various operations related to MPC control of an industrial process. Interface 60 allows processing devices to receive data and provide signals to actuators or controllers.

Figure 2:
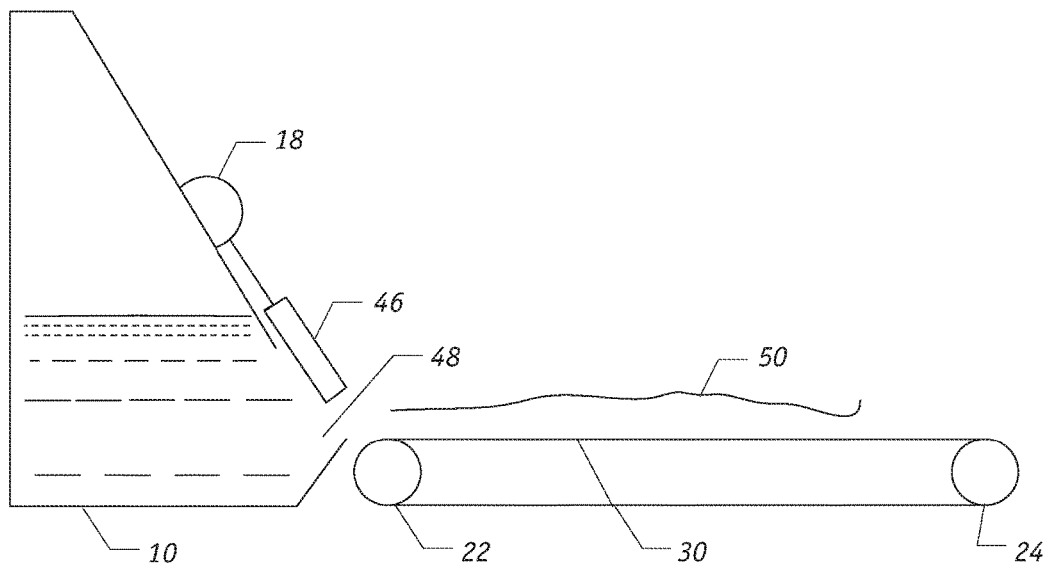

FIG. 2 depicts a slice lip control system which is mounted on a headbox 10 for controlling the extent to which a flexible slice lip member 46 extends across the discharge gap 48 at the base of the headbox 10. The slice lip member 46 extends along the headbox 10 across the entire width of the web in the cross-direction. The actuator 18 controls of the slice lip member 46, but it should be understood that the individual actuators 18 are independently operable. The spacing between the individual actuators in the actuator array may or may not be uniform. Wetstock 50 is supported on wire 30 which rotates by the action of rollers 22 and 24.

Figure 3:
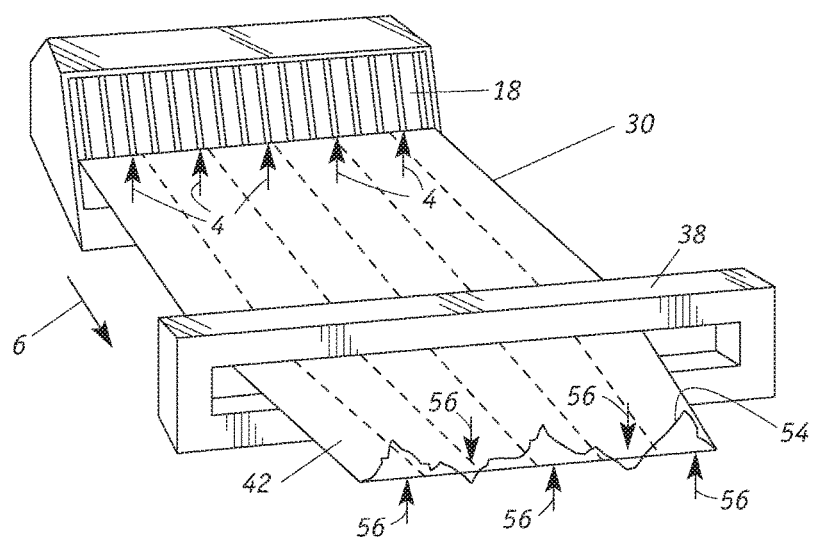

As an example shown in FIG. 3, the amount of feedstock that is discharged through the gap between the slice lip member and the surface of the web 30 of any given actuator is adjustable by controlling the individual actuator 18. The feed flow rates through the gaps ultimately affect the properties of the finished sheet material, i.e., the paper 42. Specifically, as illustrated, a plurality of actuators 18 extend in the cross direction over web 30 that is moving in the machine direction indicated by arrow 6. Actuators 18 can be manipulated to control sheet parameters in the cross direction. A scanning device 38 is located downstream from the actuators and it measures one or more the properties of the sheet. In this example, several actuators 18 are displaced as indicated by arrows 4 and the resulting changes in sheet property is detected by scanner 38 as indicated by the scanner profile 54. By averaging many scans of the sheet, the peaks of profile 54 indicated by arrows 56 can be determined. This type of operation is typically used in traditional open and closed-loop bump tests. It should be noted that besides being positioned in the headbox, actuators can be placed at one or more strategic locations in the papermaking machine including, for example, in the steamboxes, dryers, and vacuum boxes. The actuators are preferably positioned along the CD at each location.

It is understood that the inventive technique is sufficiently flexible as to be applicable for online implementation with any large-scale industrial multiple actuator array and multiple product quality measurements cross-directional process that is controlled by a single-input-single-output (SISO) controller or by a multivariable model predictive controller (MPC) such as in papermaking. Suitable paper machine processes where paper is continuously manufactured from wet stock are further described, for instance, in U.S. Pat. No. 6,807,510 to Backstrom et al., and U.S. Pat. No. 8,224,476 to Chu et al., and U.S. 2015/0268645 to Shi et al., which are incorporated herein by reference. While the invention will be described with respect to a paper-making machine, it is understood that the invention is applicable to industrial plastic sheetmaking, rubber sheetmaking, and sheet metal operations.

I. CD-MPC Structure

Figure 4:
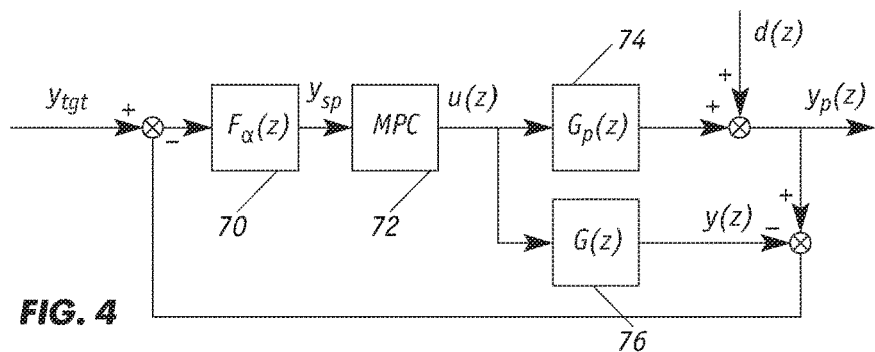
FIG. 4 is a block diagram of a closed-loop CD-MPC system.

As shown in FIG. 4, the closed-loop CD-MPC structure for a paper-making process consists of four parts: the real process $G_p(z)$ (74), the nominal model $G(z)$ (76), the MPC (72) and the temporal filter $F_a(z)$ (70), which are illustrated in detail in the following. Moreover, the associated signals are defined as follows: $y_{tgt}$, $y_{sp}$, $u(z)$, $d(z)$, $y_p(z)$, and $y(z)$ are the output target, the reference trajectory, the actuator profile, the disturbance profile, the measurement profile, and the predicted output profile, respectively.

Nominal Model

The nominal model $G(z)$ of a CD paper-making process is characterized by $$G(z) = G_0 h(z), \quad h(z) = \frac{(1-a)z^{-t_d}}{1 - az^{-1}}, \qquad (1)$$

where $G_0$ is a constant matrix that characterizes the spatial response/gain of the CD process; $h(z)$ is the temporal transfer function of the process, in which $\alpha$ and $t_d$ are the time constant and time delay in the discretized version.

The spatial gain matrix $G_0$ has the parameterized structure as shown below:

$$G_0 = [g_1, \ldots, g_n] \in \mathbb{R}^{m \times n}, \qquad (2)$$

$$g_k = f(x, \gamma, \eta, \xi, \beta, c_k)$$
$$= \frac{\gamma}{2} \left\{ e^{-\frac{\eta(x - c_k + \beta \xi)^2}{\xi^2}} \cos\left[\frac{\pi(x - c_k + \beta \xi)}{\xi}\right] + e^{-\frac{\eta(x - c_k - \beta \xi)^2}{\xi^2}} \cos\left[\frac{\pi(x - c_k - \beta \xi)}{\xi}\right] \right\},$$

$$x = 1, \ldots, m, k = 1, \ldots n,$$

where $\gamma$, $\eta$, $\xi$, and $\beta$ are the process gain, attenuation, width, and divergence, respectively. They are utilized to characterize the spatial response of each specific actuator. For the $k^{th}$ actuator, $c_k$ is the alignment parameter that determines the center of the corresponding spatial response.

Model Uncertainty

Since model-plant mismatch is unavoidable in process operation and identification, model uncertainties are considered in this invention. Based on traditional definitions in robust control to represent model mismatch, it is assumed that the real process model belongs to a set of possible models, characterized by an unstructured or parametric perturbation on the nominal model in (1). As parametric uncertainty is easy to understand and specify by the end users in the pulp and paper industry, the real process model $G_p(z)$ is then described by $$G_p(z) = G_0^p h_p(z), \qquad (3)$$

$$G_0^p = [g_{1p}, \ldots, g_{np}],$$

$$g_{kp} = f(x, \gamma_p, \eta_p, \xi_p, \beta_p, c_k^p),$$

$$\gamma_p = (1 + r_\gamma)\gamma, \quad \eta_p = (1 + r_\eta)\eta,$$

$$\xi_p = (1 + r_\xi)\xi, \quad \beta_p = (1 + r_\beta)\beta,$$

$$c_k^p = c_k + \varepsilon,$$

$$h_p(z) = \frac{(1 - a_p)z^{-t_{dp}}}{1 - a_p z^{-1}},$$

$$a_p = (1 + r_a)a, \quad t_{dp} = (1 + r_{t_d})t_d,$$

$$k = 1, \ldots, n, x = 1, \ldots, m,$$

where $r_\gamma \in [\underline{r}_\gamma, \overline{r}_\gamma]$, $r_\eta \in [\underline{r}_\eta, \overline{r}_\eta]$, $r_\xi \in [\underline{r}_\xi, \overline{r}_\xi]$, $r_\beta \in [\underline{r}_\beta, \overline{r}_\beta]$, $r_\alpha \in [\underline{r}_\alpha, \overline{r}_\alpha]$, $r_{t_d} \in [\underline{r}_{t_d}, \overline{r}_{t_d}]$, and $\varepsilon \in [-\underline{\varepsilon}(m/n), \overline{\varepsilon}(m/n),]$ are utilized to characterize the parametric uncertainties. These trust ranges are also represented as $\gamma_p \in [\underline{\gamma}, \overline{\gamma}]$, $\eta_p \in [\underline{\eta}, \overline{\eta}]$, $\xi_p \in [\underline{\xi}, \overline{\xi}]$, $\beta_p \in [\underline{\beta}, \overline{\beta}]$, $\alpha_p \in [\underline{\alpha}, \overline{\alpha}]$, and $t_{dp} \in [\underline{t}_d, \overline{t}_d]$ for brevity, note that as $\varepsilon$ is a global perturbation on all $c_k^p$, $k=1, \ldots, n$, $\varepsilon \in [\underline{\varepsilon}, \overline{\varepsilon}]$ is utilized to represent the trust region of the alignment parameter. Therefore, a set of perturbed models can be characterized by the uncertain model parameters $\gamma_p$, $\eta_p$, $\beta_p$, $\xi_p$, $\varepsilon$, $\alpha_p$, $t_{dp}$.

CD Model Predictive Controller

For industrial CD-MPC controllers that are applied in paper mills, the following optimization problem is solved:

$$\min_{\Delta u(k)} \left\{ \sum_{i=1}^{H_p} (y(k+i) - y_{sp}(k+i))^T Q_1 (y(k+i) - y_{sp}(k+i)) + \right. \quad (4)$$

$$\sum_{i=0}^{H_u-1} [\Delta u(k+i)^T Q_2 \Delta u(k+i) + (u(k+i) - u_{sp}(k+i))^T$$

$$\left. Q_3(u(k+i) - u_{sp}(k+i)) + u(k+i)^T Q_4 u(k+i)] \right\},$$

subject to the system dynamics defined in (1) and the constraints as follows:

$$\Omega \Delta u(k) \le b - \Gamma u(k-1), \quad (5)$$

where $H_p$ is the prediction horizon, and Hu is the control horizon; $y(k) \in R^m$ and $y_{sp}(k) \in R^m$ are the predicted output profile and the corresponding reference signal; $u(k) \in R^n$ and $u_{sp}(k) \in R^n$ are the actuator profile and its reference; $\Delta u(k)$ ($=u(k)-u(k-1)$) is the change in the actuator profile; $Q_1$ to $Q_3$ are diagonal weighting matrices; $Q_4$ is the weighting matrix on the actuator bending/picketing in the following form:

$$Q_4 = q_4 S_b^T S_b, \quad (6)$$

$$S_b = \begin{bmatrix} -1 & 1 & 0 & \cdots & \cdots & \cdots & 0 \\ 1 & -2 & 1 & \ddots & \ddots & \ddots & \vdots \\ 0 & 1 & -2 & \ddots & \ddots & \ddots & \vdots \\ \vdots & \ddots & \ddots & \ddots & \ddots & \ddots & \vdots \\ \vdots & \ddots & \ddots & \ddots & -2 & 1 & 0 \\ \vdots & \ddots & \ddots & \ddots & 1 & -2 & 1 \\ 0 & \cdots & \cdots & \cdots & 0 & 1 & -1 \end{bmatrix},$$

where $q_4$ is a scalar weight and $S_b \in R^{n \times n}$ is the "bending moment matrix". Note that for the actuator profile, the first and second order derivatives are incorporated in the matrix $S_b$, and thus the bending behavior is penalized in the cost function of CD-MPC. $\Omega$, $\Gamma$ and b are the constraint matrices (vectors) derived based on the physical limitations of the process.

Temporal Filter

The traditional output reference trajectory is constructed as a step change, which requires the predicted output profile to track the output target immediately after the dead time of the process. For illustrative purposes, a known temporal filter is utilized to generate the reference trajectory $Y_{sp}(k)$ based on $$Y_{sp}(k) = F_\alpha(y_{tgt}(k) - d_y(k)), \quad (7)$$

where $y_{tgt}(k)$ is the output target, and $d_y(k) = y_p(k) - y(k)$ is the disturbance estimated based on the process output $y_p(k)$ and predicted output $y(k)$. $F_\alpha$ is the time domain implementation of $f_\alpha(z)$ based on $y_{sp}(z) = f_\alpha(z)I_m(y_{tgt}(z) - d_y(z))$ and $f_\alpha(z)$ is the temporal filter $$f_\alpha(z) = \frac{(1-a_r)z^{-t_d}}{1-a_r z^{-1}}, \quad (8)$$

where $a_r = e^{-\Delta T/\alpha \tau}$; $\Delta T$ is the sampling time, and $\tau$ is the continuous-time time constant of the temporal transfer function of the process; $I_m$ represents an m-by-m identity matrix. Note that based on this filter, the aggressiveness of the control signal can be adjusted by the parameter $\alpha$ with $Q_2$ set to a small-valued scalar matrix.

Closed-Loop Transfer Functions

In order to analyze the properties of the CD-MPC shown in (4), we calculate the equivalent transfer matrices with the unconstrained MPC, and then evaluate robust stability and performance of the corresponding closed-loop system. To aid the analysis, the closed-loop system can be rearranged in FIG. 5. $K_r(z)$ (80) and $K_\alpha(z)$ (88) are derived based on the explicit solution of the unconstrained MPC. Note that as the unconstrained MPC is exploited, the resultant closed-loop system is linear.

Figure 5:
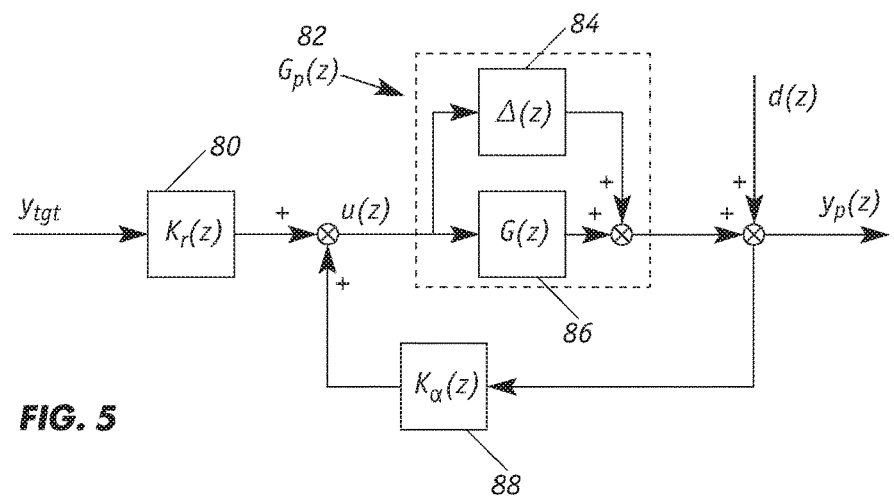
FIG. 5 is a block diagram of a closed-loop CD-MPC system.

In FIG. 5, $G_p(z)$ (82) is the real process that is different from the nominal model G(z), (86) and can be represented in the additive uncertainty form $$G_p(z) = G(z) + \Delta(z), \quad (9)$$

in which $\Delta(z)$ (84) denotes the model uncertainty.

Robust stability is analyzed using the small gain theorem. Specifically, given the parametric uncertainties defined in (3), the closed-loop system in FIG. 5 is robustly stable for all $G_p(z)$ if it is nominally stable and $$\|T_{ud}(z)\Delta(z)\|_\infty < 1 \rightarrow \bar{\sigma}(T_{ud}(e^{i\omega})\Delta(e^{i\omega})) < 1, \forall \omega, \quad (10)$$

$$T_{ud}(z) = K_\alpha(z)[I - G(z)K_\alpha(z)]^{-1}, \quad (11)$$

where $\bar{\sigma}(A)$ denotes the maximum singular value of a matrix A; $\Delta(z)$ is the model uncertainty in (9) and $T_{ud}(z) \in C^{n \times m}$ is the sensitivity function from the disturbance profile d(z) to the input profile u(z) at the nominal case.

Since the performance of CD control is characterized by its capability to suppress the disturbance, the closed-loop transfer function from the disturbance profile d(z) to the output profile y(z) is used to evaluate the performance $$T_{yd}(z) = [I - G(z)K_\alpha(z)]^{-1}, \quad (12)$$

where $T_{yd}(z) \in C^{m \times m}$.

$T_{ud}(z)$ and $T_{yd}(z)$ are employed as the key transfer functions in this paper for evaluating the closed-loop system performance.

Given the CD-MPC structure shown in FIG. 4, the closed-loop system behavior is affected by the following parameters: the penalty matrices $Q_1$ to $Q_4$, the temporal filter parameter $\alpha$, the prediction horizon $H_p$, and the control horizon $H_u$.

Note that in industrial practices, the prediction horizon $H_p$ is normally selected to be 4 times the summation of the time constant and delay; the control horizon $H_u = 1$ is usually utilized in large-scale MPC (can also be increased based on practical situations); $Q_1$ is often fixed in robust tuning. Consequently, only $Q_3$, $Q_4$, and $\alpha$ are the tuning parameters in this analysis. As the spatial tuning and temporal tuning can be considered independently, we only consider spatial tuning in the work, and corresponding design objective is to tune the parameters so that: (1) the closed-loop system is robustly spatial stable and (2) the variability of the steady-state actuator and measurement profiles is minimized.

The traditional idea is to conduct the tuning based on the sensitivity functions $T_{yd} \in C^{m \times m}$ and $T_{ud} \in C^{n \times m}$ which, however, have very large dimensions (n can be as high as 300, and m as high as 2000). Such large dimensionality makes the analysis and tuning difficult, and therefore a two-dimensional frequency analysis is introduced in the next section.

II. Two-Dimensional Frequency Analysis

This section describes the two-dimensional frequency analysis of CD processes and illustrates the decoupling property of the two-dimensional frequencies. The spatially invariant property is one of the most important features of CD processes; this allows us to approximate the plant model G(z) as an RCM, and further represent it in the two-dimensional (spatial and temporal) frequency domain. Thus, the multi-variable transfer function G(z) can be simplified into a group of single-input, single-output transfer functions. Denote $\check{G}(z)$ as the two-dimensional frequency domain representation of G(z), and it can be calculated by $$\check{G}(z) = F_m G(z) F_n^H, \quad (13)$$

where $F_m$ and $F_n$ are the complex Fourier matrices with dimension m and n, respectively. Without loss of generality, we assume m>n in this analysis. Then, all the frequency information of G(z) is contained in the following transfer functions:

$$\{\check{g}(v_1, z), \ldots, \check{g}(v_m z)\} = \text{DIAG}(F_m G(z) F_n^H), \quad (14)$$

where DIAG(A) denotes the operation of getting the following elements of a rectangular matrix $A \in C^{m \times n}$: DIAG $(A)^1 = \{A(1,1), \ldots, A(k,k), A(k+1+m-n, k+1), \ldots, A(m,n)\}$, where k=n/2 if in is even, or k=(n+1)/2 if n is odd; and $$\check{g}(v_j, z) = \frac{\check{g}(v_j)(1-a)z^{-t_d}}{1-az^{-1}}, \text{ for } j = 1, \ldots, n. \quad (15)$$

Note that based on (15), the spatial frequency response gain of G(z) at $v_j$ is $|\check{g}(v_j)|$, where $v_j$, j=1, . . . , n, are the spatial frequencies with engineering units.

Given the special structure of CD processes, it can be further shown that the corresponding sensitivity functions $T_{yd}(z)$, $T_{ud}(z)$ are also RCMs. Thus, they can also be analyzed in the two-dimensional frequency domain as follows:

$$\check{T}_{yd}(Z) = F_m T_{yd}(z) F_m^H,$$

$$\check{T}_{ud}(Z) = F_n T_{ud}(z) F_m^H,$$

$$\{\check{t}_{yd}(v_1, z), \ldots, \check{t}_{yd}(v_m z)\} = \text{diag}(\check{T}_{yd}(z)),$$

$$\{\check{t}_{ud}(v_1, z), \ldots, \check{t}_{ud}(v_n z)\} = \text{DIAG}(\check{T}_{ud}(z)), \quad (16)$$

where diag(A) represents the diagonal elements of a square matrix A. Therefore controller tuning can be implemented based on the sensitivity functions $\check{t}_{ud}(v\ z)$ and $\check{t}_{yd}(v, z)$ in the two-dimensional frequency domain. Following the idea of CD-MPC tuning for unstructured uncertainty, the tuning task can be separated into two parts: spatial tuning at z=1 ($z=e^{i\omega}$, $\omega$=0) via $Q_3$ and $Q_4$, and temporal tuning at v=0 via the parameter $\alpha$ (which has the same function as $Q_2$). In the following, the spatial tuning is explored.

III. Spatial Tuning for CD-MPC

In this section, we develop the spatial tuning algorithm. In spatial tuning, the objective is to tune matrices $Q_3 = q_3 I_n$, $Q_4 = q_4 S_b^T S_b$ for robust stability and for improving consistency of the actuator and measurement profiles. First a new $S_b$ matrix is designed to improve the spatial performance and then a tuning algorithm is proposed to automatically adjust the weights $q_3$ and $q_4$.

The New $S_b$ to Shape the Spectra of the Actuator Profile

In this subsection, we first perform a spatial frequency analysis on the existing $S_b$ and then propose a new $S_b$ to improve the performance. Note that the spatial frequency representation of a signal can be calculated by the Discrete Fourier Transform (DFT), i.e., given a signal $y \in C^m$, its spatial frequency representation can be obtained by $$\check{y} = F_m \cdot y, \quad (17)$$

where $F_m$ is the Fourier matrix. To further analyze the signal in the spatial frequency domain, we need the following useful lemma.

Lemma 1. Given spatial signals $y \in C^m$ and $u \in C^n$, and assuming $N \in C^{m \times n}$ is an RCM, if $y = N \cdot u$, then $$\check{y} = \check{N} \cdot \check{u}, \quad (18)$$

where $\check{N} = F_m N F_n^H$.

Note that if N is a constant RCM, $\check{N}$ in Lemma 1 denotes its spatial frequency domain representation.

In the cost function of CD-MPC, the cost term associated with $Q_4$ is $$u(k+i)^T Q_4 u(k+i) = (S_b \mu(k+i))^T q_4 (S_b \mu(k+i)),$$

where the matrix $S_b$ can be approximated as an RCM; its spatial frequency domain representation can be calculated as $$\{\check{sb}(v_1), \ldots, \check{sb}(v_n)\} = \text{diag}(F_n S_b F_n^H). \quad (19)$$

Figure 6:
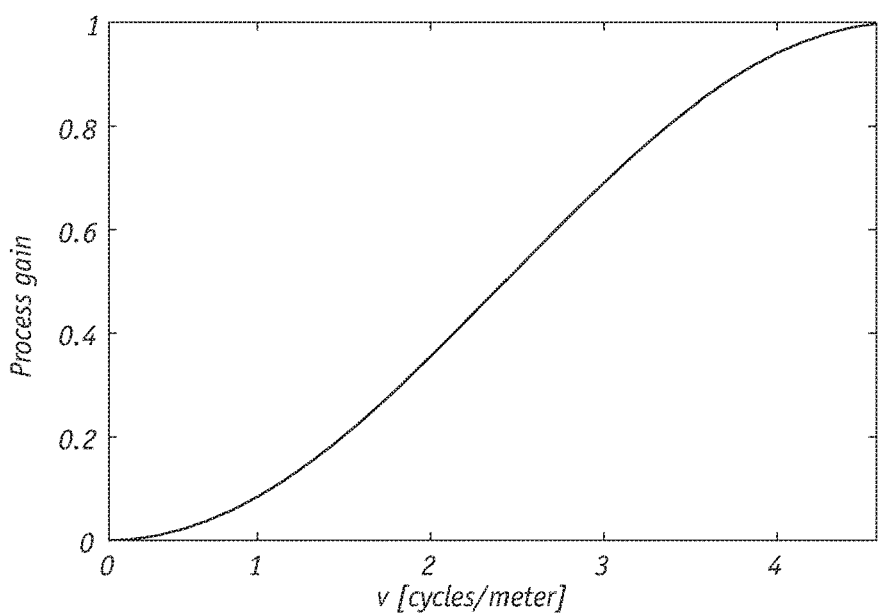
FIG. 6 is the spatial frequency response of the existing $S_b$.

FIG. 6 illustrates the spatial frequency response (gain) of the existing $S_b$ (namely, $|\check{sb}(v_j)|$), in which we can see that $S_b$ looks like a high pass filter in the spatial frequency domain. Therefore, when $Q_4$ penalizes the actuator picketing, based on Lemma 1, it actually puts more weights on the high frequency components of the actuator profile, which works like a low pass filter to suppress the high frequency components in the actuator profile u. The reason that an actuator profile with high spatial frequency (namely, actuator picketing) is not desired is that CD processes normally have very small gains at high spatial frequencies (also known as ill-conditioning), and an actuator profile with high spatial frequency could lead to instability of CD processes. However, the spatial frequency response of different CD processes behave differently, and thus, it is beneficial to design a specific $S_b$ for a specific CD process.

To achieve better robustness and performance, the new $S_b$ here is designed to be a high pass spatial filter whose stop band can be adjusted according to different CD processes. To achieve this objective, the definition of cut-off frequency, which is used to characterize the spatial frequency response gain of a CD process, is introduced as follows.

Definition 1.

Assume the maximum gain of the spatial frequency response of a CD process is $g_{max}$. The cut-off frequency vc is the spatial frequency at which the following holds $$g_{v_c} = r \cdot g_{max}, r \in (0, 0.5]. \quad (20)$$

Figure 7:
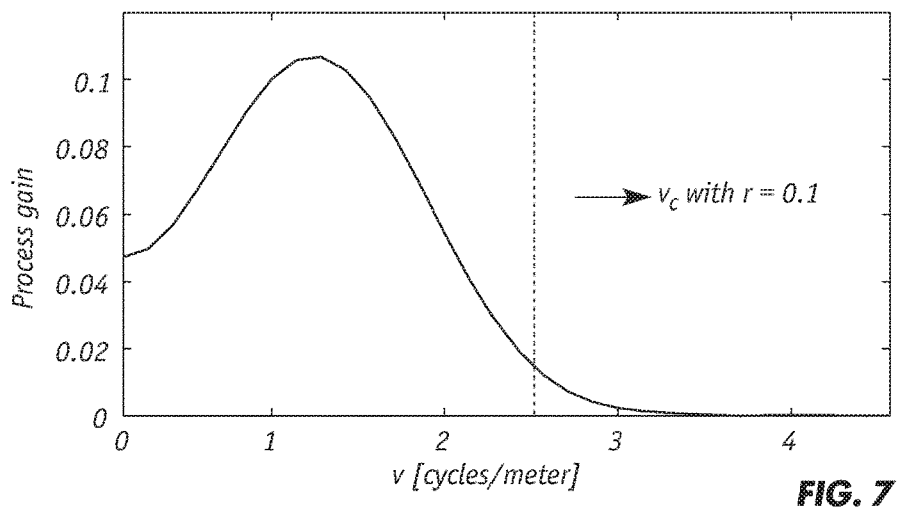
FIG. 7 illustrates the definition of the cut-off frequency $v_c$.

FIG. 7 illustrates the above definition using one of the typical single beam CD processes (note that we use r=0.1 in this analysis).

As the process is almost uncontrollable above the cut-off frequency, the actuator profile with the spatial frequency components that is higher than $v_c$ is not desirable. Therefore, the stop band of the new $S_b$ can be selected based on $v_c$ of a given CD process, which allows the new Sb to put more weights on the high spatial frequency components ($>v_c$) in the input profile while putting small or zero weights on the spatial frequency that is smaller than $v_c$. The first approach is to design the new $S_b$ as a high pass Finite Impulsive Response (FIR) filter with the stop band that equals $v_c$ of a given process model. This can be realized by the following algorithm.

Algorithm 1 (Design $S_b$ as a high pass FIR filter with stop band that equal $v_c$)
1: Input $G_0$;
2: Calculate $v_c$ based on $G_0$;
3: Design a low pass filter based on the sinc function and the window function with the stop band that equals $v_c$;

4: Conduct the inverse Fourier transform to obtain the filter in the spatial domain;
5: Construct the desired high pass filter $S_b$ via spectral inversion of the filter obtained in line 4;
6: End Executing Algorithm 1 yields the desired $S_b$. However, there exist two drawbacks for this method: (1) the stop band of $S_b$ (which we denote as $v_b$ hereafter) may not equal $v_c$ exactly, because the length of the filter is limited by the size of the penalty matrix; (2) even if $v_b=v_c$ can be achieved accurately, the transition band of the filter $S_b$ still needs to be optimized based on the spatial frequency response of $G(z)$.

Considering the aforementioned drawbacks, it is desirable to design $S_b$ with a spectrum that is the mirror of the system's spatial frequency response with respect to the cut-off frequency. To achieve this target, we need to introduce the real valued Fourier matrix, which is defined below.

Definition 2.

The real valued Fourier matrix $F^r \in R^{n \times n}$ defined as $$F_n^r(j,k) = \begin{cases} \sqrt{\dfrac{1}{n}}, & j=1, \\ \sqrt{\dfrac{2}{n}} \cdot \sin[(k-1)v_j], & j=2, \ldots, q, \\ \sqrt{\dfrac{2}{n}} \cdot \cos[(k-1)v_j], & j=q+1, \ldots, n \end{cases} \quad (21)$$

where $q=(n+1)/2$ if n is odd, or $q=n/2$ if n is even; $v_j=2\pi(j-1)/n$ is the spatial frequency.

The basic idea to generate the desired $S_b$ with real valued Fourier matrix is that we first obtain the mirrored frequency response of a given process model by numerical methods, and then perform the inverse Fourier transform using the real valued Fourier matrix, resulting in a real valued Ss with the expected spatial frequency response.

Although the real valued Fourier matrix helps build a real valued $S_b$, we still need to ensure that the obtained $S_b$ has the circulant property to retain the two-dimensional feature of the closed-loop system. Thus, we need to establish conditions on the pre-specified spectrum content to guarantee the circulant property of $S_b$.

Lemma 2.

Define $k_m(j)$, $j=1, \ldots, n$, as the pre-specified spatial frequency response gain of $S_b$. If $k_m(j) \in R$, $\forall j$, and $k_m(j)=k_m(n-j+2)$ ($j=2, \ldots, (n+1)/2$, if n is odd; or $j=2, \ldots, n/2$, if n is even), then the $S_b$ obtained via the inverse real valued Fourier transform is a symmetric real valued circulant matrix.

Proof.

As $S_b$ is a square RCM, the spatial frequency response gains of $S_b$ equal its singular values. Therefore, as the real conjugate even property is guaranteed by $k_m(j) \in R$, $\forall j$, and $k_m(j)=k_m(n-j+2)$ ($j=2, \ldots, (n+1)/2$, if n is odd; or $j=2, \ldots, n/2$, if n is even), the obtained $S_b$ is a real valued symmetric circulant matrix.

The method using the real valued Fourier matrix approach is then summarized in the following algorithm.

Figure 8:
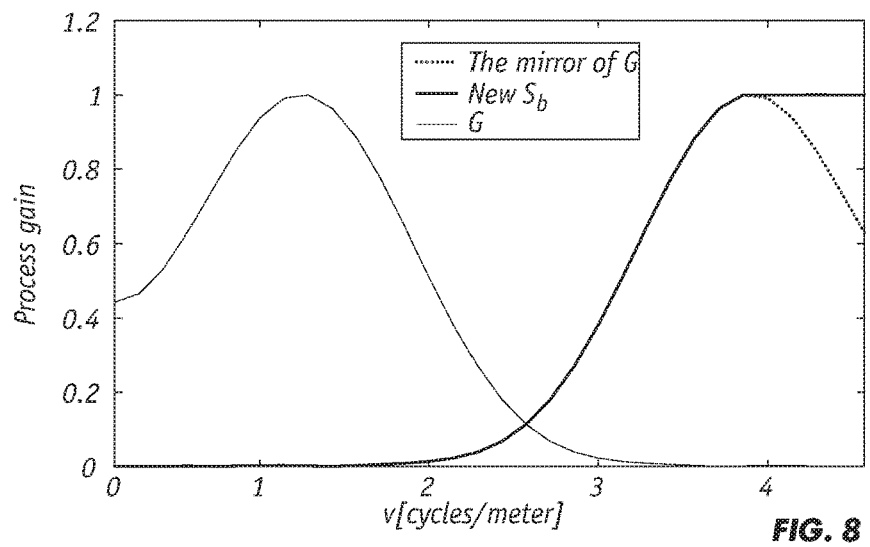
FIG. 8 illustrates the spatial frequency response of the new $S_b$ designed by Algorithm 2.

Algorithm 2 (Design $S_b$ based on the mirror of the spectrum of the system model).
1: Input $G_0$;
2: Calculate vc based on $G_0$;
3: Obtain the desired mirrored spectrum by numerical methods;
4: Process the obtained spectrum content based on Lemma 2;
5: Conduct the real valued inverse Fourier transform to obtain the weighting matrix $S_b$ in the spatial domain;
6: End FIG. 8 shows the spatial frequency response of the $S_b$ designed using Algorithm 2 for a typical single beam CD process. The closed-loop performance of the new $S_b$ is illustrated in the next section.

Performance Analysis of the New $S_b$

As the new $S_b$ is designed based on the frequency property of $G(z)$, it is expected to provide better performance compared with that of the old $S_b$. In this section, the performance improvement is illustrated based on the sensitivity analysis.

Figure 9:
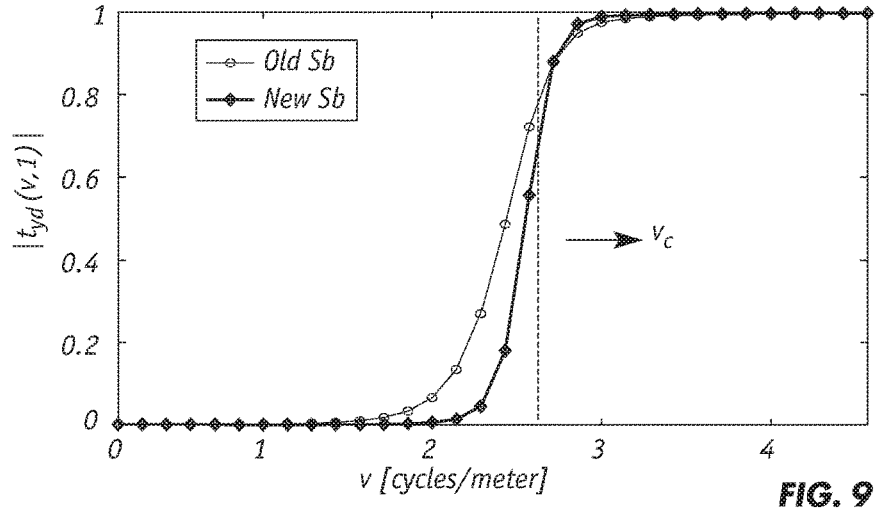
FIG. 9 illustrates the performance comparison of different $S_b$ (existing one and the proposed one) based on the sensitivity function $T_{yd}$ (z) at steady state (z=1)
Figure 10A:
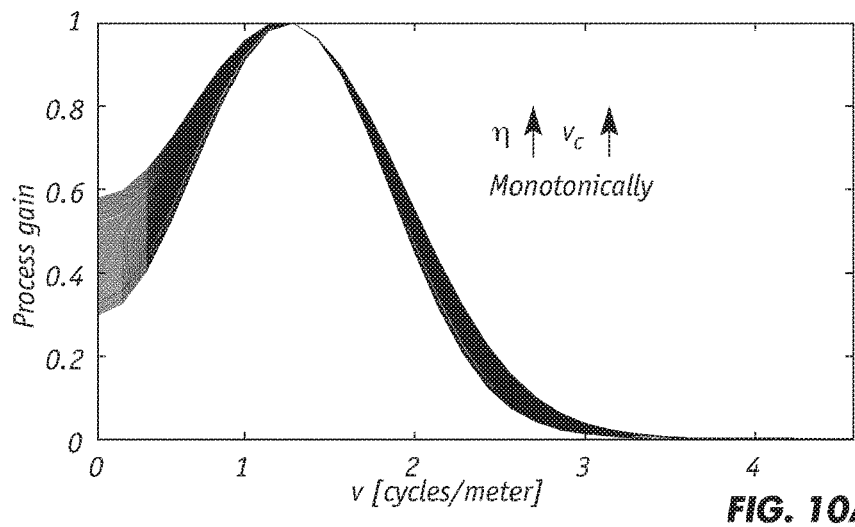
FIGS. 10(a) to 10(e) are graphs that illustrate the relationship between the spatial parameters and $v_c$ (note that $\eta_p$, $\beta_p$, $\gamma_p$, $\xi_p$, increased from 50% to 150% of the nominal values, and $\varepsilon$ is increased from −m/n to m/n.
Figure 10B:
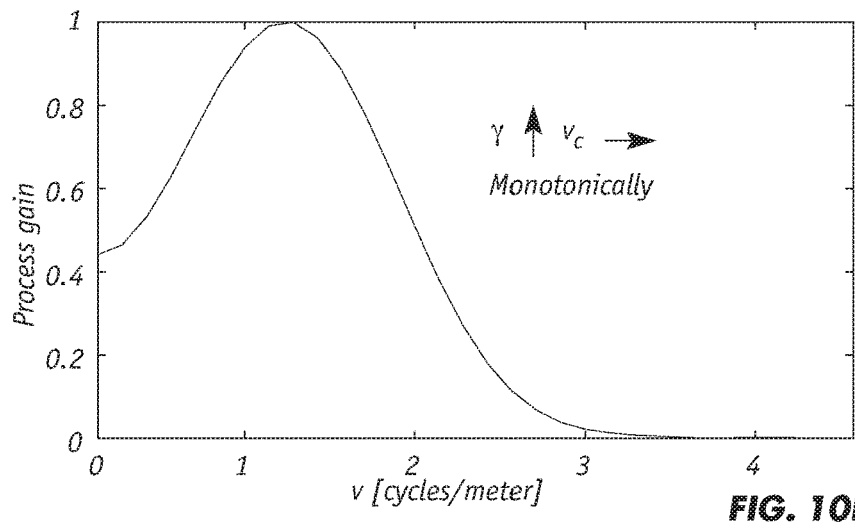
Figure 10C:
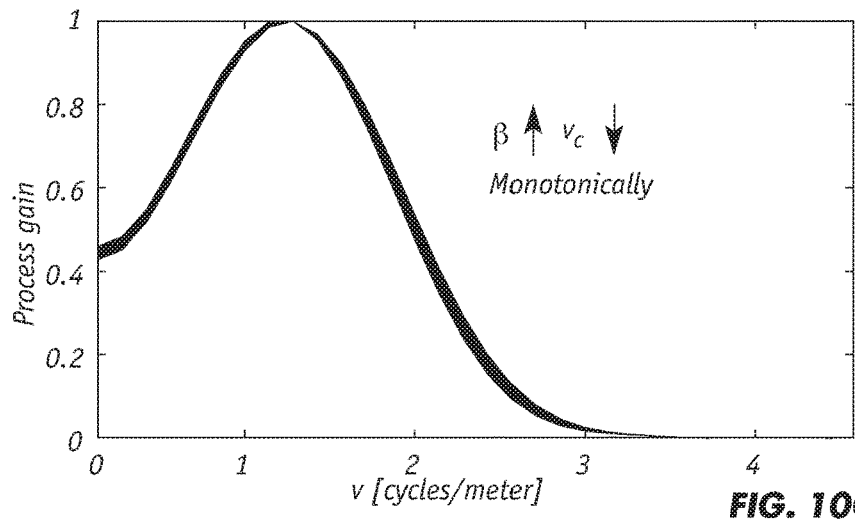
Figure 10D:
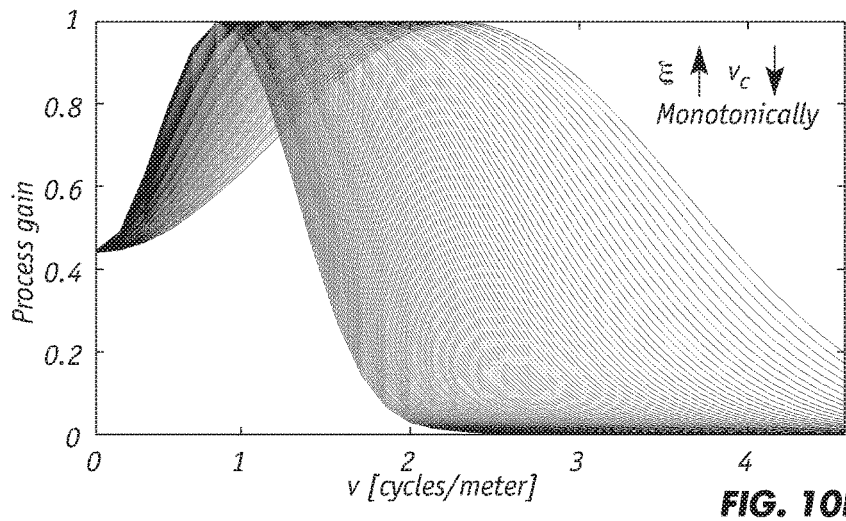
Figure 10E:
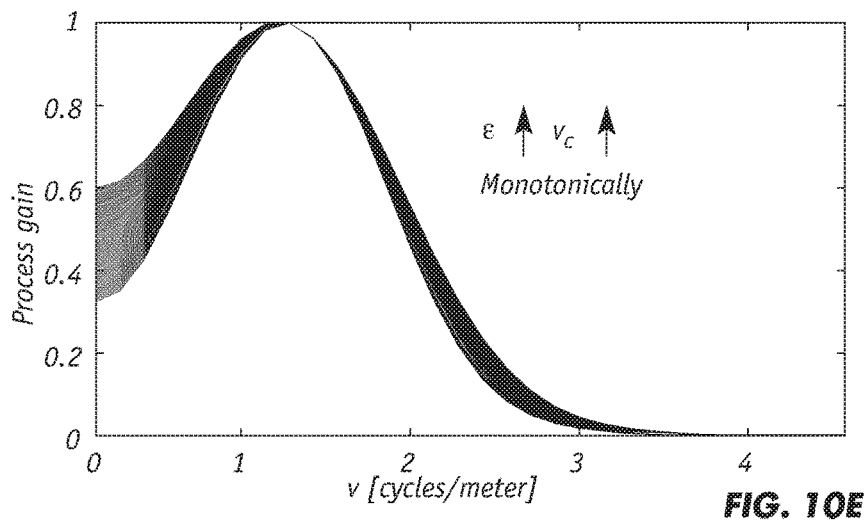

To analyze the performance of the new $S_b$, we compare the sensitivity function $T_{yd}(z)$ of the new $S_b$ with that of the old $S_b$ considering similar robustness (the peak value of $T_{ud}$ is the same). The details are shown in FIG. 9. Note that the result is only shown at the steady state (z=1) for clear display. We can see that, on the one hand, the sensitivity function with the new $S_b$ has smaller gains at low frequencies, indicating that the disturbance at low frequencies (smaller than the cut-off frequency $v_c$) can be better handled. On the other hand, for the frequency components that are higher than the cut-off $v_c$, the sensitivity function with the new $S_b$ has larger gains, which prevents the actuator profile from chasing the uncontrollable high frequency components of the disturbance.

It is worth mentioning that if there is no model mismatch, the new $S_b$ can be designed with $v_b=v_c$, and should achieve performance improvement based on the above analysis. However, in the presence of parametric uncertainty, it is better to design $v_b$ to be robust over the model mismatch, specifically, to design $v_b$ according to the worst spatial model. To achieve this target, the prediction of the worst spatial model, given user-specified parametric uncertainties, is introduced in the next section.

Worst Spatial Model Prediction Under Parametric Uncertainty

In this section, a technique to find the worst spatial model under user-specified parametric uncertainties is proposed, which can help us design a robust $S_b$ that takes the pre-specified model mismatch into account. Besides, it can also be utilized to develop a robust performance visualization method to help end users predict the possible control performance. First, we propose the definition for the worst spatial model as follows.

Definition 3.

Given the parametric uncertainty specifications $\eta_p \in [\underline{\eta}, \overline{\eta}], \beta_p \in [\underline{\beta}, \overline{\beta}], \gamma_p \in [\underline{\gamma}, \overline{\gamma}], \xi_p \in [\underline{\xi}, \overline{\xi}]$, and $\varepsilon \in [\underline{\varepsilon}, \overline{\varepsilon}]$, the worst spatial model refers to the spatial model that has the smallest cut-off frequency among all the possible models due to parametric uncertainty.

Based on Definition 3, the cut-off frequency of the worst spatial model under parametric uncertainty can be obtained by $$\min_{\eta_p, \beta_p, \gamma_p, \xi_p, \varepsilon} v_c(G_p(z)) \quad (22)$$

s.t. $\eta_p \in [\underline{\eta}, \overline{\eta}], \beta_p \in [\underline{\beta}, \overline{\beta}],$ $\gamma_p \in [\underline{\gamma}, \overline{\gamma}], \xi_p \in [\underline{\xi}, \overline{\xi}], \varepsilon \in [\underline{\varepsilon}, \overline{\varepsilon}].$ Lemma 3.

The cut-off frequency vc for a given process model $G_p(z)$ is independent of the process gain parameter $\gamma_p$.

Proof. As $G_p(z)$ can be approximated as an RCM, $v_c$ can be obtained by $f(x, \eta_p, \beta_p, \gamma_p, \xi_p, c_k^p)$ for any k. Therefore, as $\gamma_p$ is a multiplication term in $f(x, \eta_p, \beta_p, \xi_p, c_k^p)$, it does not affect the normalized shape of the spectrum of the system model $G_p(z)$ based on the property of the Fourier transform, and thus is independent of $v_c$.

The approach utilized here is to hold all the spatial parameters except one to analyze how the change of this parameter affects the cut-off frequency $v_c$, and apply similar analysis to the parameters $\eta_p, \gamma_p, \gamma_p, \xi_p, \varepsilon$ one by one. The results of the aforementioned method are shown in FIG. 10 for one CD process. It is observed that the cut-off frequency $v_c$ is changing monotonically with respect to $\eta_p, \beta_p, \xi_p, \varepsilon$ and is not affected by $\gamma_p$. As $v_c(G_p(z))$ is independent of $\gamma_p$, and is changing monotonically with respect to each of $\eta_p, \beta_p, \xi_p, \varepsilon$, the smallest cut-off frequency can be obtained by solving the following optimization problem:

$$\min_{\eta_p, \beta_p, \xi_p, \varepsilon} v_c(G_p(z)) \qquad (23)$$

$$\text{s.t. } \eta_p \in \{\underline{\eta}, \overline{\eta}\}, \beta_p \in \{\underline{\beta}, \overline{\beta}\},$$

$$\xi_p \in \{\underline{\xi}, \overline{\xi}\}, \varepsilon \in [\underline{\varepsilon}, \overline{\varepsilon}].$$

The obtained worst cut-off frequency is denoted as $v_w$, and will be utilized in the robust spatial tuning of CD-MPC.

The Automated Spatial Tuning

The spatial tuning of robust CD-MPC contains two parts: (1) the selection of the stop band $v_b$ of the matrix $S_b$; (2) the selection of q3 and q4. Note that following the idea in existing CD-MPC tuning methods, the weight q3 is selected to be the same as q4 to simplify the robust tuning problem (this new weight is denoted as $q_f$).

Figure 11A:
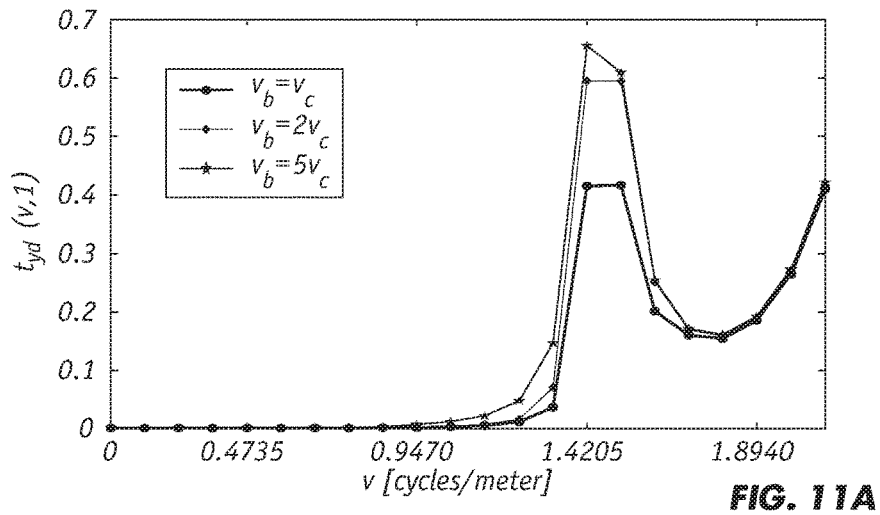
FIGS. 11(a) and 11(b) illustrate the sensitivity function $T_{yd}$ (z) and control sensitivity $T_{ud}$ (z), respectively, in the spatial frequency domain with (z=1)
Figure 11B:
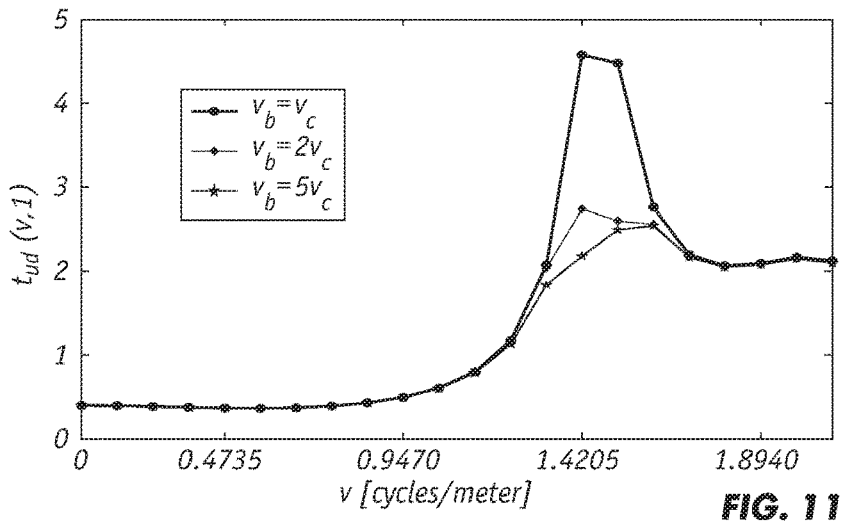

In order to achieve the tuning objective, the analysis based on the sensitivity functions is utilized to provide some tuning guidelines, and then the automated tuning approach is proposed. FIGS. 11(a) and 11(b) illustrate the effect of changing $v_b$ in the sensitivity functions, and it is observed that a larger $v_b$ gives better robustness, while a smaller $v_b$ gives better performance. If there is no model mismatch, we can select $v_b = v_c$ based on the spatial frequency response of a given process model, the performance of which is also illustrated previously in FIGS. 6 to 9. As we can predict the worst spatial model that has the smallest cut-off frequency ($v_w$) based on the approach in the previous subsection, the design of $v_b = v_w$ directly takes care of the given parametric uncertainties, so that a good robustness property can be obtained.

Figure 12A:
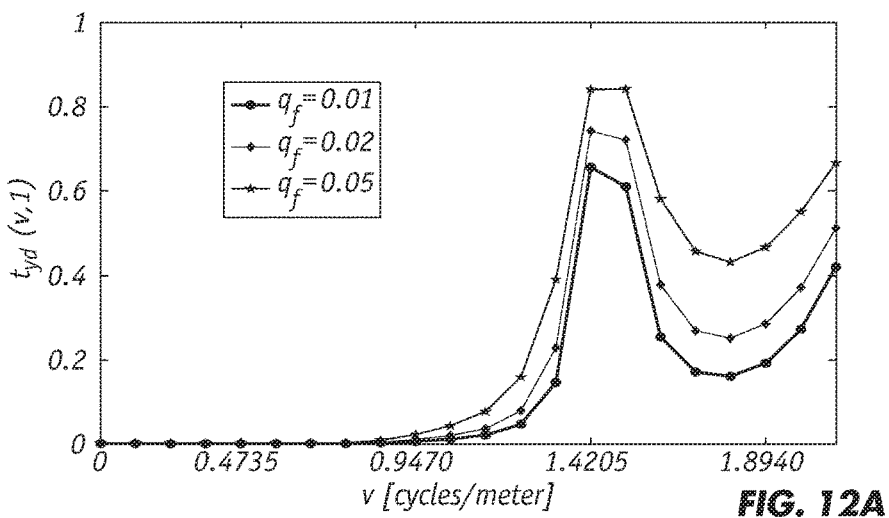
FIGS. 12(a) and 12(b) illustrate the sensitivity function $T_{yd}$ (z) and control sensitivity $T_{ud}$ (z), respectively, in the spatial frequency domain with (z=1)
Figure 12B:
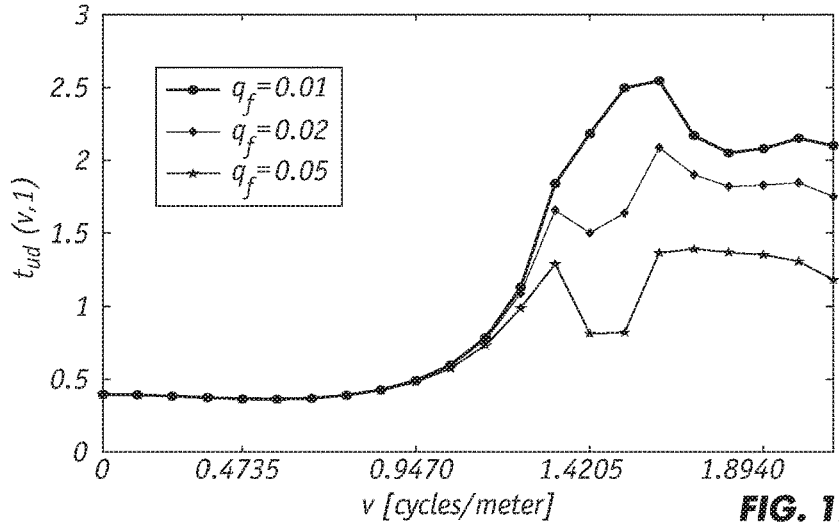
Figure 13A:
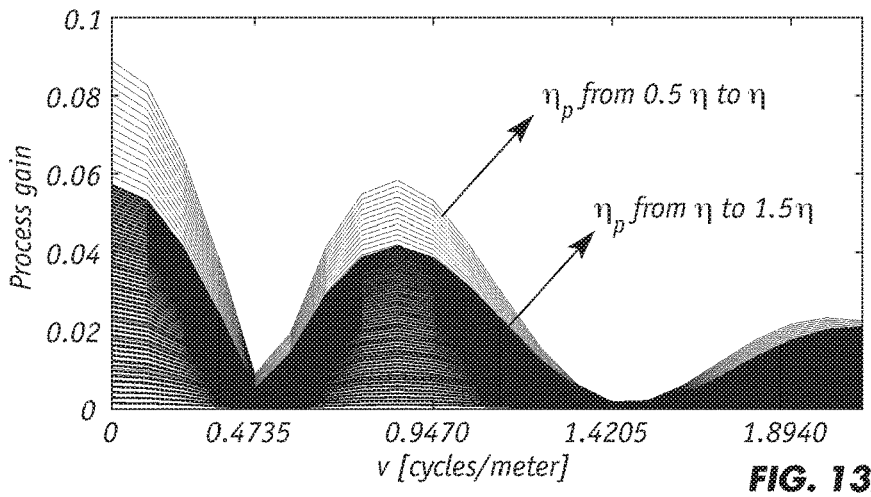
FIGS. 13(a) to 13(e) illustrate the relationship between the spatial parameters and the spatial gain $|\delta (v_j, 1)|$.
Figure 13B:
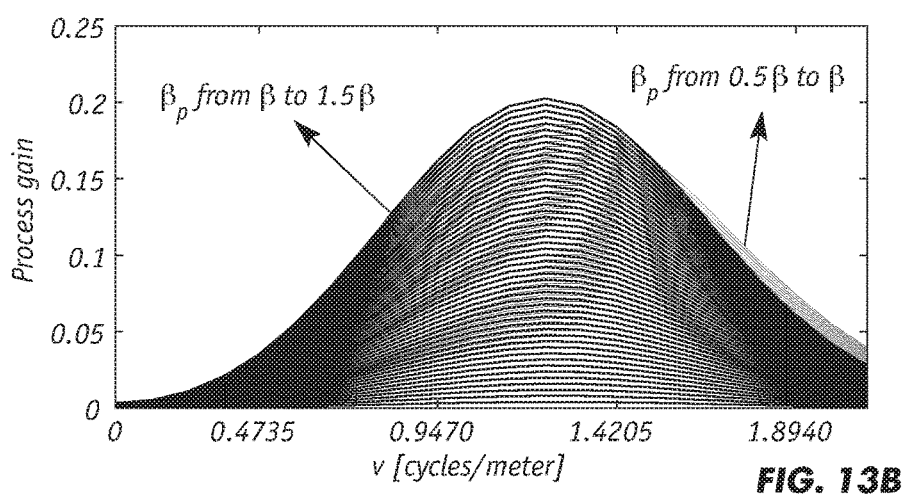
Figure 13C:
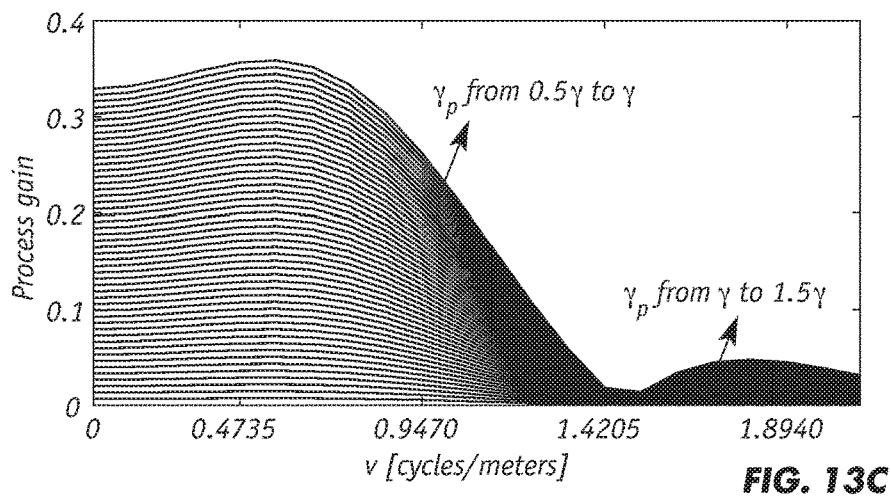
Figure 13D:
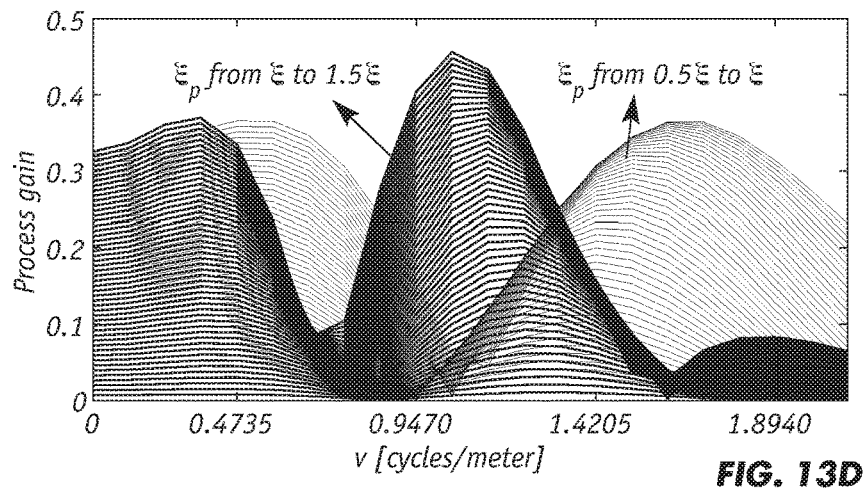
Figure 13E:
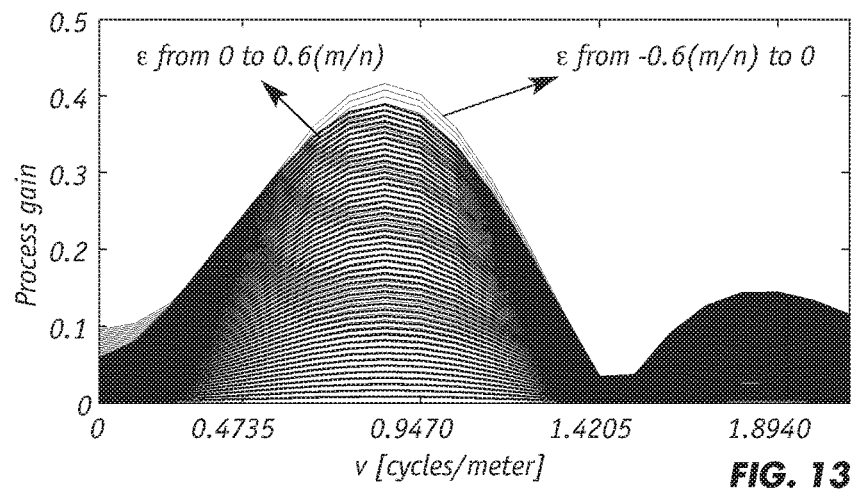

Similar analysis can also be applied to the parameter $q_f$, and the results are shown in FIGS. 12(a) and 12(b). We can observe that a larger $q_f$ gives better robustness, while a smaller $q_f$ gives better performance. As $v_b = v_w$ is selected, the tuning objective of $q_f$ is to achieve robust stability in the spatial domain with z=1. As robust stability and performance are characterized based on sensitivity functions, it is useful to derive the sensitivity functions in the spatial frequency domain with z=1 (steady state $\omega=0$), which are obtained as follows:

$$T_{yd}(z=1) = (I + G_0(Q_3 + Q_4)^{-1} G_m^T Q_1)^{-1}, \qquad (24)$$

$$T_{ud}(z=1) = (Q_3 + Q_4 + G_m^T Q_1 G_0)^{-1} G_m^T Q_1, \qquad (25)$$

where $G_m = \Sigma_{k=1}^{Hp-td} \Sigma_{l=1}^{k} \alpha^{l-1}$.

The tuning objective is then to find the smallest $q_f$ so that the robust stability condition in the spatial frequency domain is satisfied, because it can provide the best performance while still guaranteeing robust stability according to the tuning guidelines in FIGS. 12(a) and 12(b). Based on the robust stability condition in (11) and the two-dimensional frequency analysis, robust stability at z=1 can be achieved if the following condition is satisfied:

$$\overline{\sigma}(T_{ud}(1)\Delta(1)) < 1. \qquad (26)$$

However, in the presence of parametric uncertainty, the singular values of $\Delta(1)$ are hard to compute directly, and therefore the analysis on the uncertain term is carried out first. From (9), the uncertain term $\Delta(1)$ can be represented as $$\Delta(1) = G_p(1) - G(1). \qquad (27)$$

As uncertainties are specified on the model parameters, $G_p(1)$ is also an RCM based on the method that generates the spatial gain matrix in (2). Then, $\Delta(1)$ is also an RCM according to the property that the RCM is closed on the summation operation, and therefore it can also be transformed into two-dimensional frequencies $$\check{\Delta}(1) = F_m \Delta(1) F_n^H.$$

$$\{\delta(v_1, 1), \ldots, \delta(v_n, 1)\} = \text{diag}(\check{\Delta}(1)). \qquad (28)$$

Then, since the singular values equal the gains along the spatial frequencies, equation (26) can then be represented in the two-dimensional frequency domain as $$\max_{j}(|\check{t}_{ud}(v_j, 1)\delta(v_j, 1)|) < 1 \rightarrow |\check{t}_{ud}(v_j, 1)| < \frac{1}{|\delta(v_j, 1)|}, \forall j, \qquad (29)$$

where $\check{t}_{ud}(v_j, 1)$ is the sensitivity function $T_{ud}(z)$ with z=1.

Existing tuning approaches for large-scale systems normally consider unstructured uncertainty, in which $\Delta(1)$ is a constant for all spatial frequency. In the proposed approach, however, we consider parametric uncertainty to improve user-friendliness, and therefore the key problem here is to calculate the singular values $|\delta(v_j, 1)|$, $\forall j$, given the user-specified parametric uncertainties in (3), which can be mathematically formulated as $$\max_{\eta_p, \beta_p, \gamma_p, \xi_p, \varepsilon} |\delta(v_j, 1)|, \text{ for } j = 1, \ldots, n \qquad (30)$$

$$\text{s.t. } \eta_p \in [\underline{\eta}, \overline{\eta}], \beta_p \in [\underline{\beta}, \overline{\beta}],$$

$$\gamma_p \in [\underline{\gamma}, \overline{\gamma}], \xi_p \in [\underline{\xi}, \overline{\xi}], \varepsilon \in [\underline{\varepsilon}, \overline{\varepsilon}].$$

It is worth noting that $\mu$ analysis cannot be applied here because of the large dimensionality of CD processes (n can be as high as 300, and m as high as 2000) and the nonlinearity of $f(x, \gamma_p, \eta_p, \gamma_p, \xi_p, c_k^p)$.

Due to high nonlinearity of $f(x, \gamma_p, \eta_p, \gamma_p, \xi_p, c_k^p)$, based on which $G_p(z)$ and $G(z)$ are generated, explicit representations of the maximum singular values of $\Delta$ at $v_j$, j= 1, ..., n, are hard to achieve. Therefore the following approach is utilized to obtain an approximate solution to the problem in (30). Given the temporal frequency z=1, as the singular values of $\Delta$ can be obtained by its spatial frequency gains, we can analyze how the spatial gain changes along the spatial frequency with respect to each of the spatial parameters. We increase each of the parameters from its lower bound (50% of the nominal value) to the upper bound (150% times the nominal value) in (3) with all the other parameters fixed, and analyze the change of the spatial gains. The results of this analysis are shown in FIGS. 13(a) to 13(e) for a typical process, which indicate that the spatial gain at each frequency is decreasing monotonically when a specified parameter is increasing from its lower bound to its nominal value (light lines) while increasing when the parameter increases within the other half of the region (darker lines). It is observed that in FIG. 13, $|\delta(v_j, 1)|$ for j=1, . . . , n, is charging monotonically with respect to each of $\eta_p$, $\beta_p$, $\gamma_p$, $\xi_p$, $\varepsilon$, so that the extreme values should occur at the boundaries of the uncertainty regions. Thus, the optimized problem in (30) is equivalent to:

$$\max_{\eta_p, \beta_p, \gamma_p, \xi_p, \varepsilon} |\delta(v_j, 1)|, \text{ for } j = 1, \ldots, n \quad (31)$$

$$\text{s.t. } \eta_p \in \{\underline{\eta}, \overline{\eta}\}, \beta_p \in \{\underline{\beta}, \overline{\beta}\},$$

$$\gamma_p \in \{\underline{\gamma}, \overline{\gamma}\}, \xi_p \in \{\underline{\xi}, \overline{\xi}\}, \varepsilon \in \{\underline{\varepsilon}, \overline{\varepsilon}\}.$$

Note that in the optimization problem in (31), only the extreme case spatial parameters are considered, which simplifies the problem at hand.

Although the monotonicity property cannot be rigorously proved, it is intuitive in that the maximum singular value, which characterizes the system behavior, usually happens at the largest amount of model mismatch. This is also verified by extensive simulations, in which we compare the maximum singular values of $\Delta$ from the proposed approach with that of a large number (>500) of $\Delta$'s generated randomly within the pre-specified uncertainty region for different processes. We only show the results for one of the typical processes, which is a single beam CD process that the dry weight is controlled by the primary autoslice, and the pre-specified parametric uncertainties are $$\gamma_p \in [0.5\gamma, 1.5\gamma], \eta_p \in [0.8\alpha, 1.2\alpha], \quad (32)$$

$$\beta_p \in [0.8\beta, 1.2\beta], \xi_p \in [0.5\xi, 1.5\xi],$$

$$\varepsilon \in \left[-0.6\frac{m}{n}, 0.6\frac{m}{n}\right].$$

Figure 14:
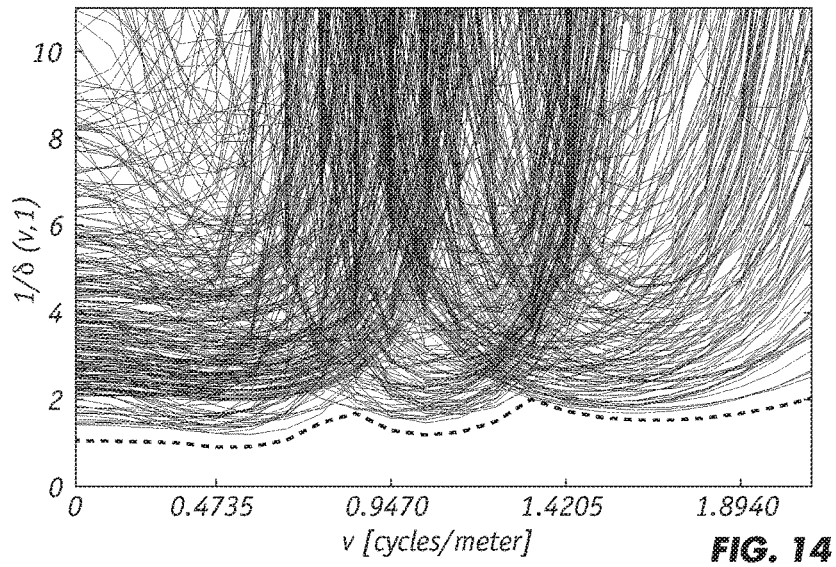
FIG. 14 is the performance illustration of the maximum singular values calculated based on the optimized problem in (31)

The results are shown in FIG. 14, in which the curves are the singular values of randomly generated systems along the spatial frequency while the lower broken bound is the maximum singular values calculated by solving the optimization problem in (31). We can see that the broken line bound is a tight bound for all possible singular values due to model mismatch.

Based on the tuning guideline of qf and the robust stability condition in (29), the desired qf can be found by utilizing a bisection search for the smallest qf that satisfies (29), which can be normally completed in about 2 second on a desktop with Intel i5 core and 6G memory.

Figure 15:
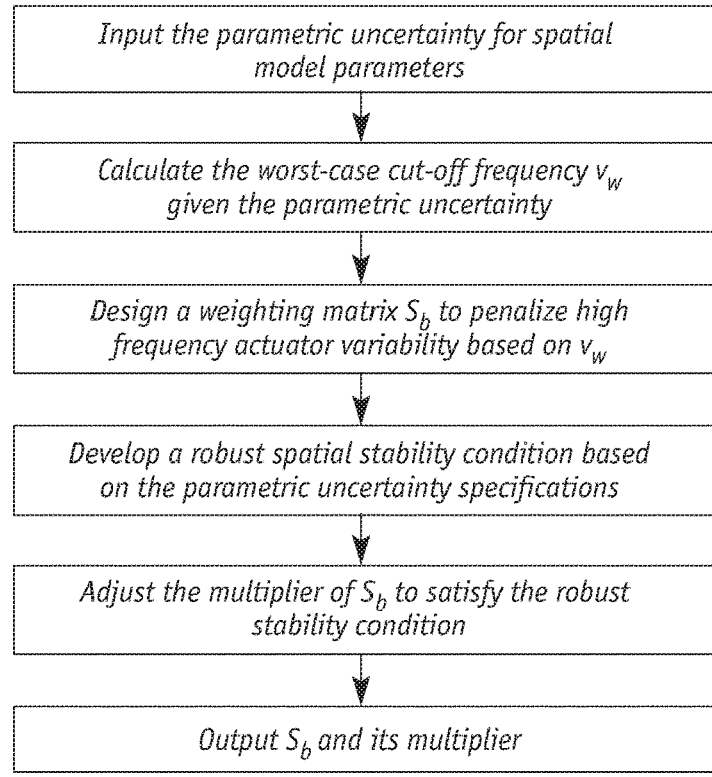
FIG. 15 is the flow chart of the automated spatial tuning.

As illustrated in FIG. 15, the automated robust spatial tuning of the CD-MPC includes six steps:

(1) Input the nominal spatial model parameters and the corresponding parametric uncertainty specifications. The "nominal spatial model parameters" refers to the parameters of the mathematical model of the process obtained from the bump test and model identification procedure. The "parametric uncertainty" refers to the trust ranges around the nominal spatial model parameters, which characterize the possible mismatch between the identified model and the real process.

(2) Calculate the worst-case cut-off frequency $v_w$ for all the possible models given the parametric uncertainty. The "worst-case cut-off frequency" refers to the smallest cut-off frequency of all possible models given the parametric uncertainty specifications (the definition of cut-off frequency is shown in Definition 1). Based on this definition, the cut-off frequencies of a large number of models based on the parametric uncertainty need to be calculated to find the worst-case cut-off, (illustrated in equation (22)). Based on Lemma 3 and the monotonicity property (shown in FIG. 10), the worst-case cut-off can be calculated only based on several extreme models (illustrated in equation (23)), which significantly reduces computational time; this guarantees the design/tuning procedure of the digital controller can be accomplished within the required amount of time.

(3) Design a weighting matrix $S_b$ to penalize high frequency actuator variability based on the process model and worst-case cut-off frequency. The "$S_b$" is a weighting matrix in the fourth penalty term (Q4) of the MPC cost function as shown in equation (6), and it controls the actuator bending/picketing behavior. The "high frequency actuator variability" refers to the actuator bending/picketing behaviour that includes frequency components beyond the worst-case cut-off frequency. To prevent the high frequency actuator variability without unnecessarily limit the actuator movement, it is desired to design $S_b$ as a spatial filter whose spatial frequency response is (or is close to) the mirror of the actuator frequency response (shown in FIG. 8) so that the penalty level at each frequency is determined based on the spatial frequency property of the process. Lemma 2 helps to achieve this idea and also guarantees the generated $S_b$ can be applied in the digital controller.

(4) Develop a robust spatial stability condition based on the parametric uncertainty specifications. "Robust spatial condition" refers to the requirement on the spatial frequency response of the closed-loop system, which guarantees the robust stability under the parametric uncertainty. Given the robust spatial condition, the frequency responses of a large amount of uncertain models generated based on the parametric uncertainty need to be tested (illustrated in equation (30)), which requires a lot of computational time; based on the monotonicity property between the model parameters and the corresponding frequency response (shown in FIG. 13) discovered in the invention, the condition can be checked based on only several critical frequency responses (illustrated in equation (31)); this saves the computational time and guarantees the design/tuning procedure of the digital controller can be accomplished within the required amount of time.

(5) Adjust the multiplier of $S_b$ in the MPC cost function to satisfy the robust stability condition. The "multiplier of $S_b$" refers to the scalar weight of the $S_b$ matrix defined in equation (6).

(6) Output the weighting matrix $S_b$ and its multiplier.

IV. Simulation Results with Real-Time Simulator

We apply the proposed new $S_b$ and the automated robust tuning algorithms to a process model obtained from a paper mill in Canada. This is a single beam process in which the dry weight of the output profile is controlled by the primary autoslice.

In this test, the parametric uncertainty specifications are given as $$\gamma_p \in [0.75\gamma, 1.25\gamma], \eta_p \in [0.75\eta, 1.25\eta], \quad (33)$$

$$\beta_p \in [0.75\beta, 1.25\beta], \xi_p \in [0.75\xi, 1.25\xi],$$

$$\varepsilon \in \left[-0.6\frac{m}{n}, 0.6\frac{m}{n}\right].$$

Figure 16:
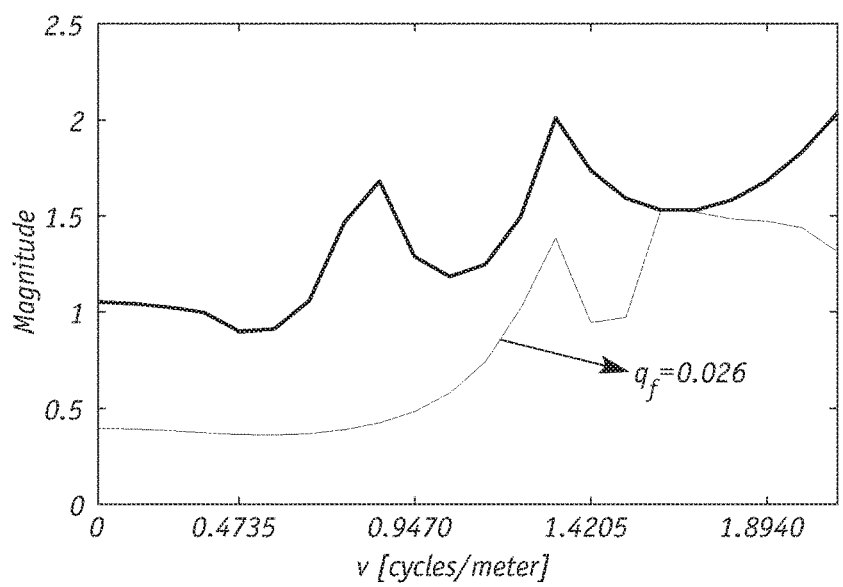
FIG. 16 illustrates spatial tuning result for the proposed approach (note that the upper line is for the $|1/\delta (v, 1)|$; and the lower line is for the $|t_{ud} (v, 1)|$.
Figure 17A:
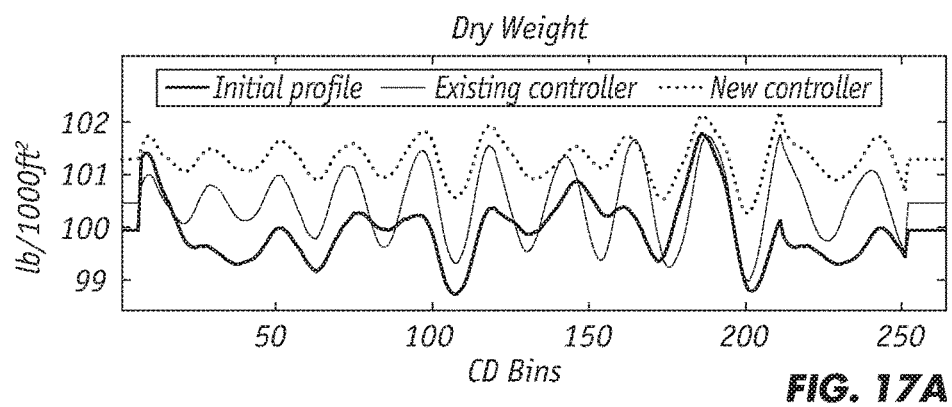
FIGS. 17(a) to 17(b) are performance illustrations for the proposed robust tuning method.
Figure 17B:
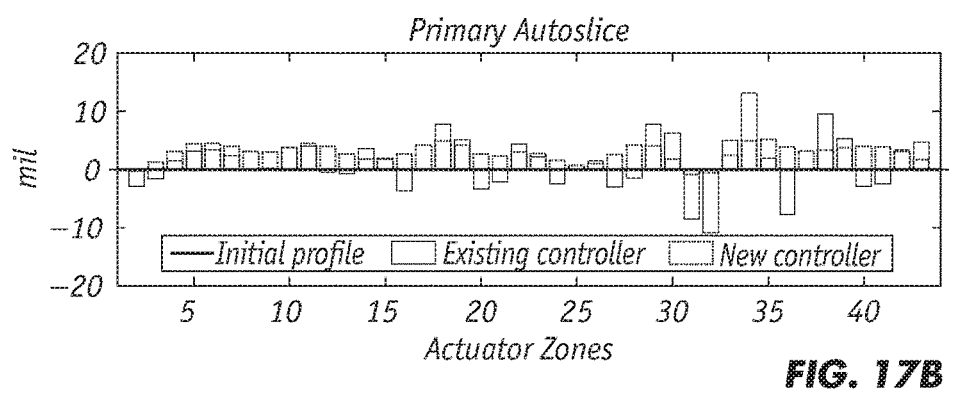

By utilizing the technique in (23), the worst cut-off frequency $v_w$ of the process model for the given parametric uncertainties in (33) can be obtained, and then the spectra penalization weighting matrix $S_b$ is designed based on the stop band $v_b=v_w$. The spatial tuning results in a qf that equals 0.026 (see FIG. 16, which shows that the stability condition in (29) is satisfied, and the temporal parameters are tuned by the existing method under 50% uncertainty on the temporal parameters, i.e., $a_p$ belongs to [0.5a,1.5a]). We then apply the obtained tuning results to the Honeywell real time MPC+ simulator environment and compare the obtained results with that of the existing controller. Note that the real process model $G_p$ is selected satisfying (33). The performance is shown in FIGS. 17(a) and 17(b). FIG. 17(a) shows the steady-state measurement profile, while FIG. 17(b) is for the corresponding actuator profile. In the figures, it is evident that the profiles using the proposed method are much better than that of the existing method as the input/output profile is less oscillatory. More specifically, the 2σ (two times of the standard deviation) of the steady-state actuator profile has been improved by about 66% while that of the measurement profile has been improved by about 44%.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

What is claimed is:

1. A system which forms a material in a spatially-distributed multivariable-array cross-directional process wherein the system comprises:
    at least one set of actuator arrays each distributed adjacent the material in the cross direction (CD), wherein each set of actuator arrays is controllable to vary the properties of the material;
    means for measuring and acquiring properties data about the properties of the material; and
    a multivariable model predictive controller (MPC) for providing CD control to the cross-directional process, wherein the MPC, in response to signals that are indicative of the properties of the properties data, provides signals to the at least one set of actuator arrays to vary properties of the material, wherein the MPC includes means for spatially tuning the MPC which comprises:
        (a) means for inputting nominal spatial model parameters and corresponding parametric uncertainty specifications;
        (b) means for calculating worst-case cut-off frequency $v_w$ for all possible process models given the parametric uncertainty specification wherein the worst-case cut-off frequency comprises the smallest cut-off frequency of all possible process models given the parametric uncertainty specifications;
        (c) means for designing a weighting matrix $S_b$ to penalize high frequency actuator variability based on the process model and worst-case cut-off frequency;
        (d) means for developing a robust spatial condition based on the parametric uncertainty specifications;
        (e) means for adjusting a multiplier of $S_b$ in a MPC cost function to satisfy the robust stability condition wherein $S_b$ is a weighting matrix in penalty term of a MPC cost function which controls actuator bending and picketing behavior; and
        (f) means for outputting the weighting matrix $S_b$ and its multiplier.

2. The system of claim 1 wherein the $S_b$ is a spatial filter whose spatial frequency response is a mirror of an actuator frequency response.

3. The system of claim 1 wherein the parametric uncertainty comprises trust ranges around the nominal spatial model parameters which characterize possible mismatch between an identified model and an actual process.

4. The system of claim 1 wherein high frequency actuator variability comprises actuator bending and picketing behavior that includes frequency components beyond the worst-case cut-off frequency.

5. The system of claim 1 wherein the nominal spatial model parameters comprise parameters of a mathematical model of the process obtained from a bump test and model identification procedure.

6. The system of claim 1 wherein the MPC includes means for spatially tuning the MPC with respect to one of the actuator arrays.

7. In a process control system having a multivariable model predictive controller (MPC) for providing control to a spatially-distributed multiple-array, sheetmaking cross-directional (CD) process having at least one manipulated actuator array and at least one controlled measurement array, a method of providing control of the multiple-array process that comprises the steps of:
    (a) tuning the MPC by the steps of:
        (i) inputting nominal spatial model parameters and corresponding parametric uncertainty specifications;
        (ii) calculating worst-case cut-off frequency $v_w$ for all possible process models given the parametric uncertainty specification;
        (iii) designing a weighting matrix $S_b$ to penalize high frequency actuator variability based on the process model and worst-case cut-off frequency wherein the worst-case cut-off frequency comprises the smallest cut-off frequency of all possible process models given the parametric uncertainty specifications;
        (iv) developing a robust spatial condition based on the parametric uncertainty specifications;
        (v) adjusting a multiplier of $S_b$ in a MPC cost function to satisfy the robust stability condition wherein $S_b$ is a weighting matrix in penalty term of a MPC cost function which controls actuator bending and picketing behavior; and
        (vi) outputting the weighting matrix $S_b$ and its multiplier;
    (b) inputting the tuning parameters into the MPC; and
    (c) controlling the multiple-array CD process with the MPC.

8. The system of claim 7 wherein the $S_b$ is a spatial filter whose spatial frequency response is a mirror of an actuator frequency response.

9. The system of claim 7 wherein the parametric uncertainty comprises trust ranges around the nominal spatial model parameters which characterize possible mismatch between an identified model and an actual process.

10. The system of claim 7 wherein high frequency actuator variability comprises actuator bending and picketing behavior that includes frequency components beyond the worst-case cut-off frequency.

11. The system of claim 7 wherein the nominal spatial model parameters comprise parameters of a mathematical model of the process obtained from a bump test and model identification procedure.

12. The system of claim 7 wherein the spatially-distributed sheetmaking process is a paper-making process.

13. A non-transitory computer readable medium embodying a computer program for automatically tuning a model predictive controller (MPC) employed to control a cross-directional process having a manipulated actuator array comprising a plurality of actuators and at least one controlled measurement array wherein the program comprises readable program code for:

(a) inputting nominal spatial model parameters and corresponding parametric uncertainty specifications;

(b) calculating worst-case cut-off frequency $v_w$ for all possible process models given the parametric uncertainty specifications wherein the worst-case cut-off frequency comprises the smallest cut-off frequency of all possible process models given the parametric uncertainty specifications;

(c) designing a weighting matrix Sb to penalize high frequency actuator variability based on the process model and worst-case cut-off frequency;

(d) developing a robust spatial condition based on the parametric uncertainty specifications;

(e) adjusting a multiplier of St in a MPC cost function to satisfy the robust stability condition wherein $S_b$ is a weighting matrix in penalty term of a MPC cost function which controls actuator bending and picketing behavior;

(f) outputting the weighting matrix $S_b$ and its multiplier;

(g) inputting tuning parameters into the MPC; and (h) controlling the cross-directional process with the MPC.

14. The computer readable medium claim 13 wherein the $S_b$ is a spatial filter whose spatial frequency response is a mirror of an actuator frequency response.

15. The computer readable medium of claim 13 wherein the parametric uncertainty comprises trust ranges around the nominal spatial model parameters which characterize possible mismatch between an identified model and an actual process.

16. The system of claim 1 wherein the at least one set of actuator arrays comprise a single array comprising of a plurality of manipulated actuators that are arranged in the CD and wherein the means for measuring and acquiring properties data about the properties of the material comprises a corresponding single controlled measurement array.

17. The system of claim 7 wherein the at least one manipulated actuator array comprises a single array comprising of a plurality of manipulated actuators that are arranged in the CD and wherein the at least one controlled measurement array comprises a corresponding single controlled measurement array.

18. The computer readable medium of claim 13 wherein the manipulated actuator array comprises a single array comprising of a plurality of manipulated actuators that are arranged in the CD and wherein the at least one controlled measurement array comprises a corresponding single controlled measurement array.

* * * * *